US006400561B1

(12) United States Patent
Horton

(10) Patent No.: US 6,400,561 B1
(45) Date of Patent: Jun. 4, 2002

(54) STORAGE SYSTEM FOR MOUNTING AND SECURING A PORTABLE COMPUTER TO A VEHICLE

(75) Inventor: John J. Horton, Canton, GA (US)

(73) Assignee: Bellsouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/432,961

(22) Filed: Nov. 3, 1999

(51) Int. Cl.[7] .............................. G06F 1/16; H05K 5/00; H05K 7/16
(52) U.S. Cl. ..................... 361/683; 361/686; 108/38; 108/44; 224/929; 248/183.2; 248/185.1; 312/22; 312/23; 312/223.3
(58) Field of Search ................................ 341/686, 683, 341/680, 681; 312/223.1–223.3, 21–30; 224/275, 929; 108/34, 38, 44; 297/140, 188.2, 188.06; 248/371, 923, 919, 185.1, 183.2

(56) References Cited

U.S. PATENT DOCUMENTS

| 4,345,147 A | * | 8/1982 | Aaron et al. .................. 361/683 |
| 4,695,104 A | * | 9/1987 | Lederman ...................... 108/44 |
| 4,837,590 A | * | 6/1989 | Sprague ........................ 361/683 |
| 4,854,538 A | * | 8/1989 | Von Schalscha ............. 248/346 |
| 4,929,948 A | * | 5/1990 | Holmberg ..................... 361/683 |
| 4,946,120 A | * | 8/1990 | Hatcher ........................ 248/183 |
| 5,092,507 A | * | 3/1992 | Szablak et al. .............. 224/275 |
| 5,177,665 A | * | 1/1993 | Frank et al. ................. 361/683 |
| 5,199,772 A | * | 4/1993 | Jordan .......................... 312/312 |
| 5,390,608 A | * | 2/1995 | McLaren et al. .............. 108/44 |
| 5,505,139 A | * | 4/1996 | Storholm et al. ......... 312/235.8 |
| 5,551,616 A | * | 9/1996 | Stitt et al. .................... 361/686 |
| 5,552,957 A | * | 9/1996 | Brown et al. ................ 361/683 |
| 5,555,491 A | * | 9/1996 | Tao .............................. 361/686 |
| 5,556,017 A | * | 9/1996 | Troy ............................. 224/549 |
| 5,560,676 A | * | 10/1996 | Griffth et al. .................. 108/44 |
| 5,564,668 A | * | 10/1996 | Crowe, II .................. 248/284.1 |
| 5,590,022 A | * | 12/1996 | Harvey ......................... 361/683 |
| 5,666,265 A | * | 9/1997 | Lutz et al. .................... 361/683 |
| 5,667,272 A | * | 9/1997 | Sutton .......................... 224/275 |
| 5,808,373 A | * | 9/1998 | Hamanishi et al. .......... 361/683 |
| 5,883,820 A | * | 3/1999 | Ota et al. ..................... 361/680 |
| 5,973,917 A | * | 10/1999 | White ........................... 361/683 |
| 6,052,279 A | * | 4/2000 | Friend et al. ................ 361/686 |

* cited by examiner

*Primary Examiner*—Leo P. Picard
*Assistant Examiner*—Lisa Lea-Edmonds
(74) *Attorney, Agent, or Firm*—Kilpatrick Stockton LLP

(57) ABSTRACT

A system for mounting and securing a portable computer to vehicle mounts to the interior of the vehicle. The system protects, secures, and houses the portable computer within a case. A mounting base mounts to the interior of the vehicle. The case includes a base plate, a platform, and a lid. The base plate mounts to the mounting base. A docking station or power supply for a portable computer mounts to the platform. The computer is positioned adjacent to the platform and mounts to the docking station or power supply for a computer mounts to the platform. The mounting base, base plate, case, or combination thereof dampens vibrations from the vehicle to the computer, thus protecting the computer from vibration damage. The lid moves with respect to the case to provide user access to the computer. The lid can further move to cover the computer to secure the computer within the case or to the platform. Internal shelves or trays within the case provide access to and house associated computer peripheral devices. Internal storage compartments inside the case provide access to and house associated office supplies. A power supply associated with the vehicle can provide electrical power to the docking station for the computer and any associated computer peripheral devices. A high gain antenna associated with the vehicle can connect to the docking station for the computer to communicate by radio frequency.

32 Claims, 22 Drawing Sheets

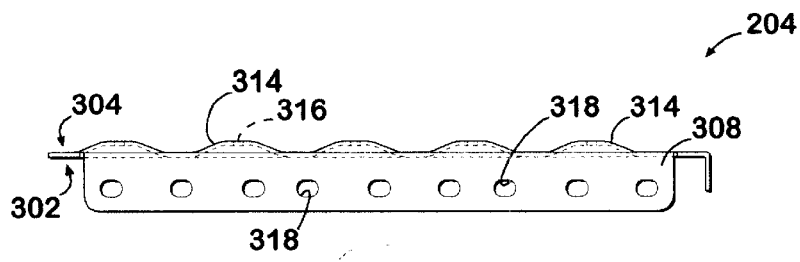
FIG.3b
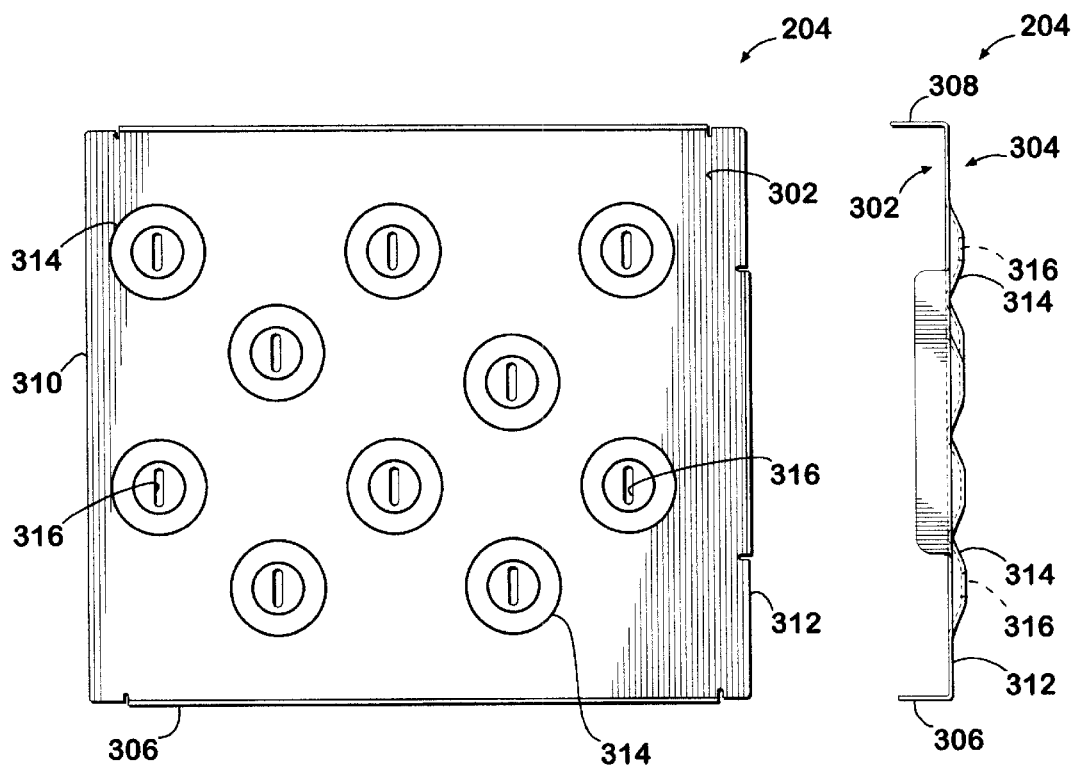
FIG.3a      FIG.3c

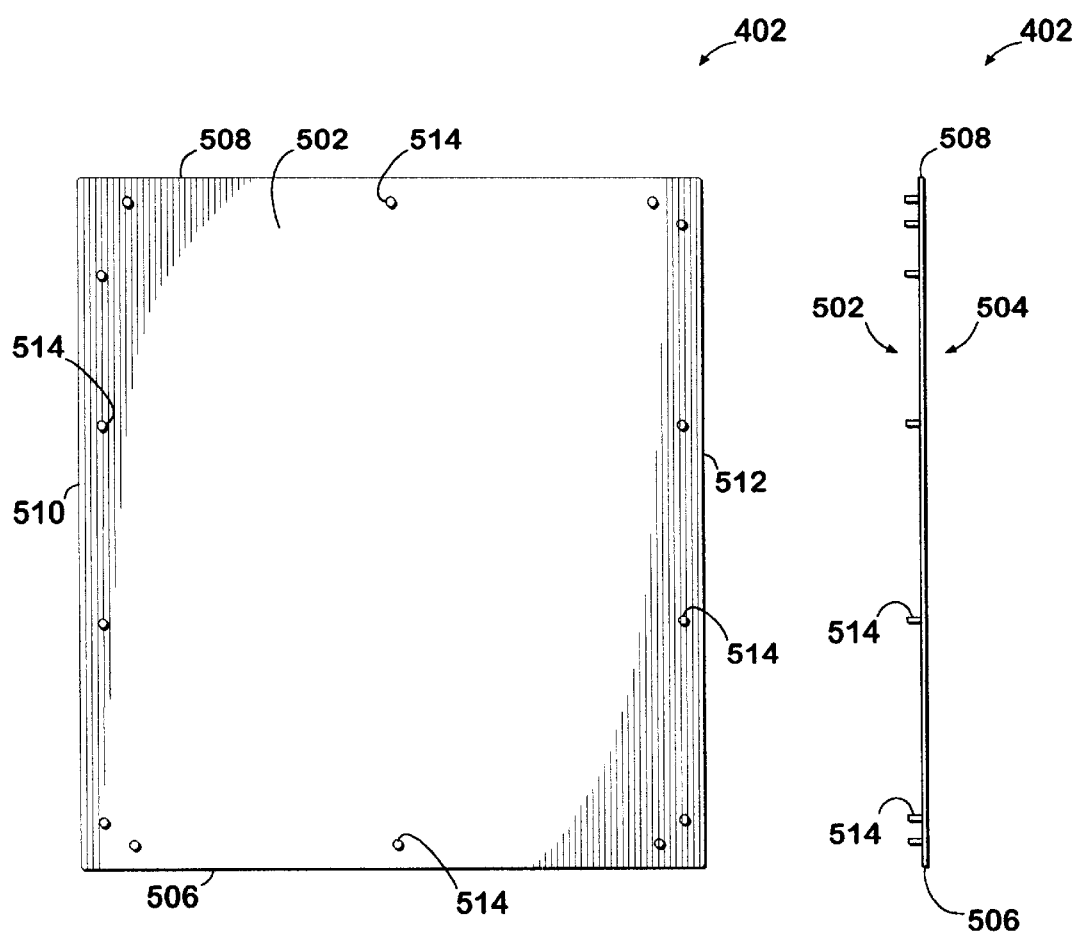
FIG.5a  FIG.5b

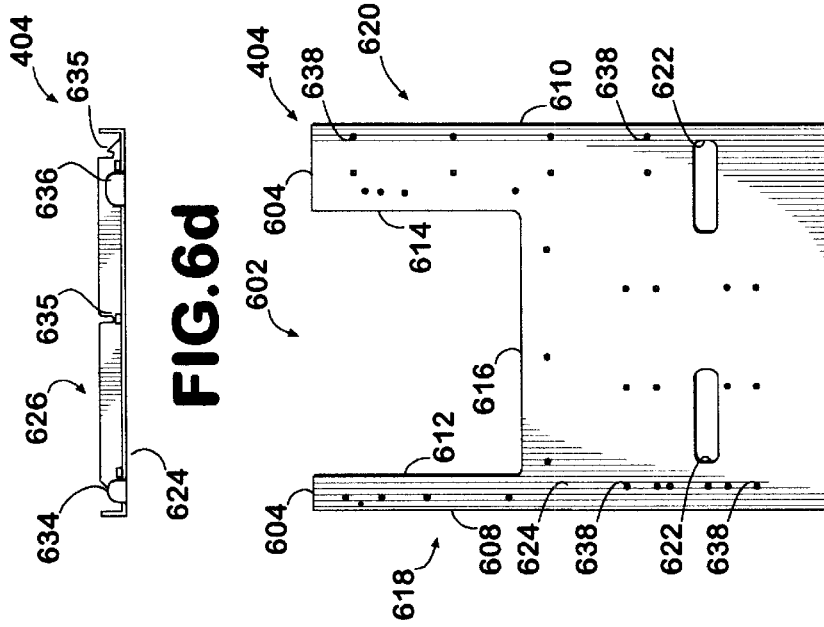

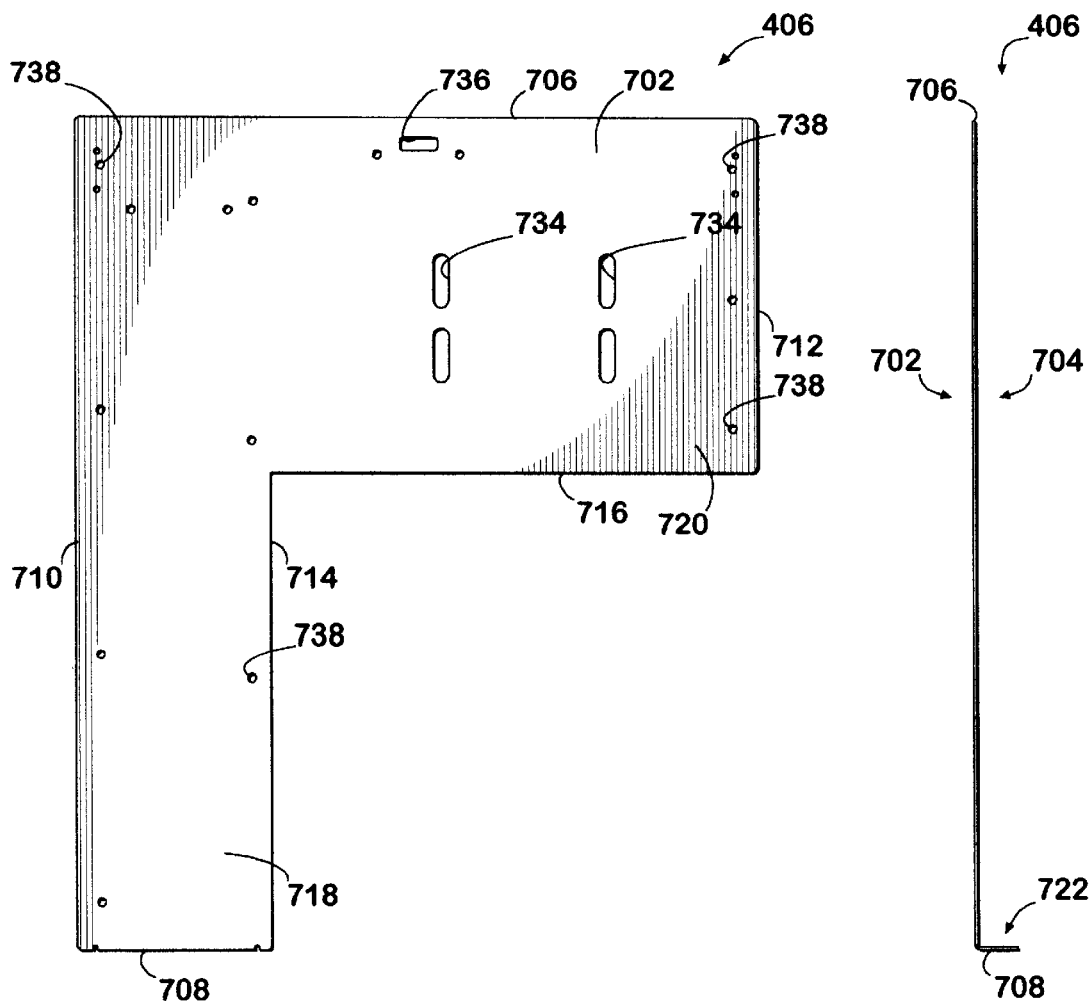
FIG.7a   FIG.7b
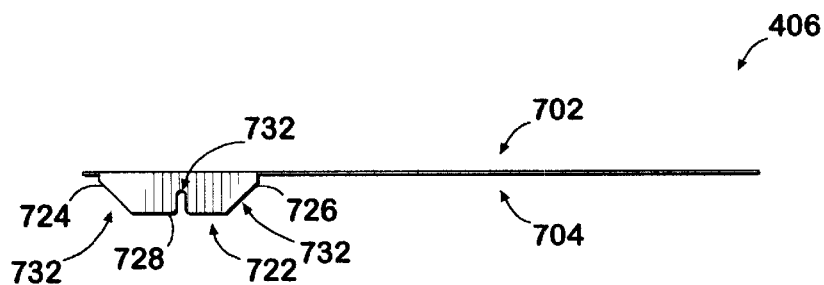
FIG.7c

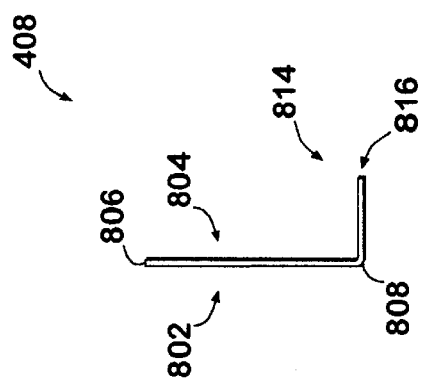
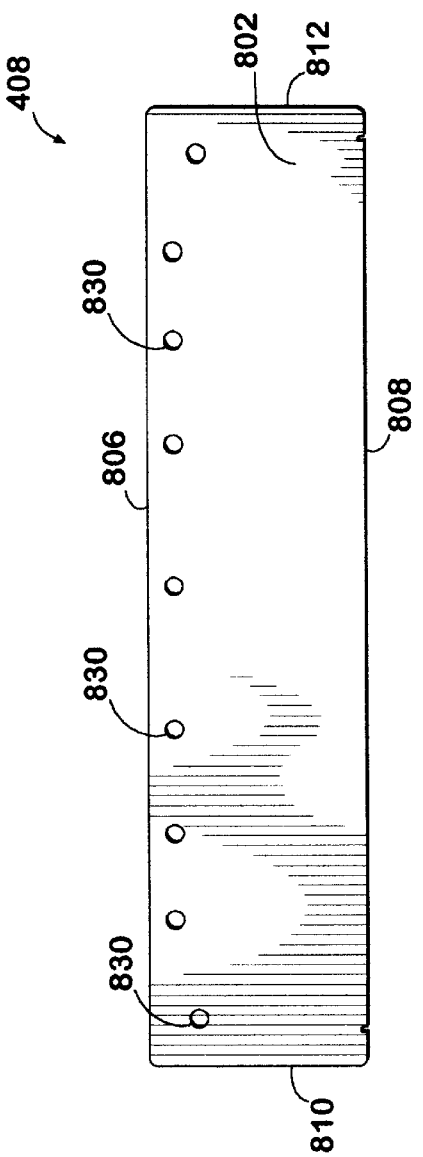
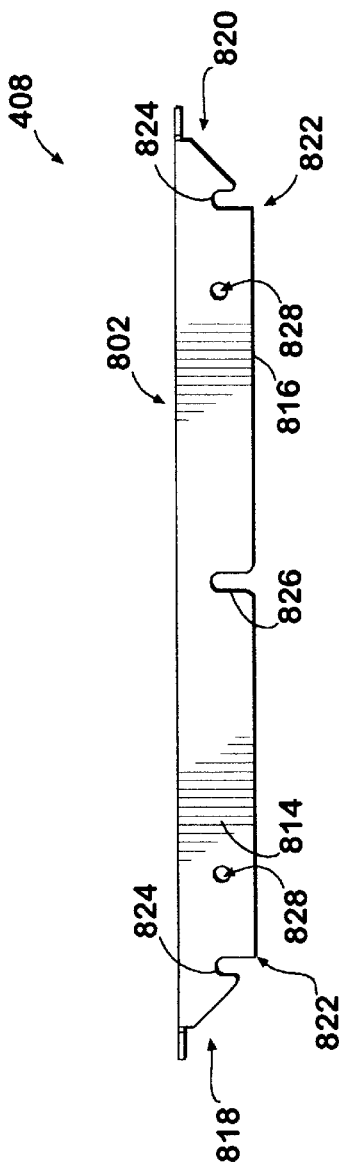

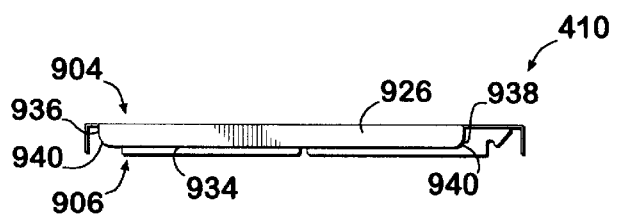
FIG.9d
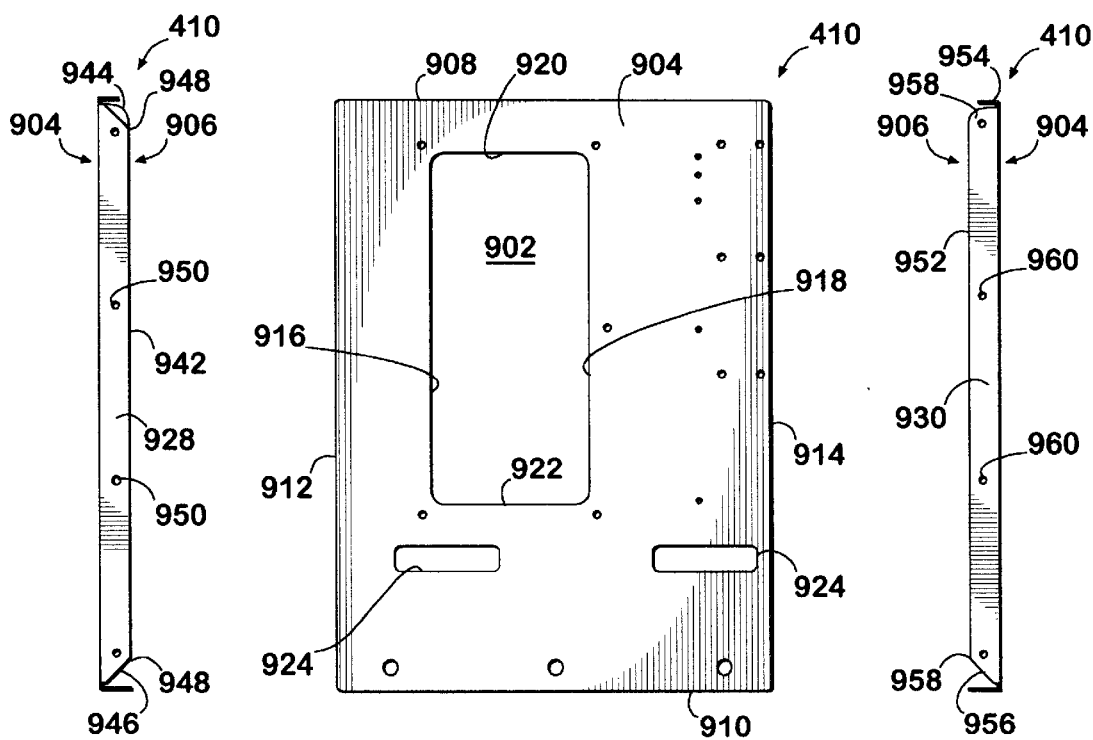
FIG.9b  FIG.9a  FIG.9c
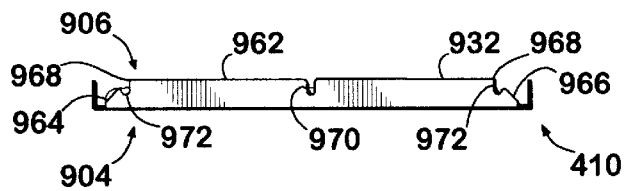
FIG.9e

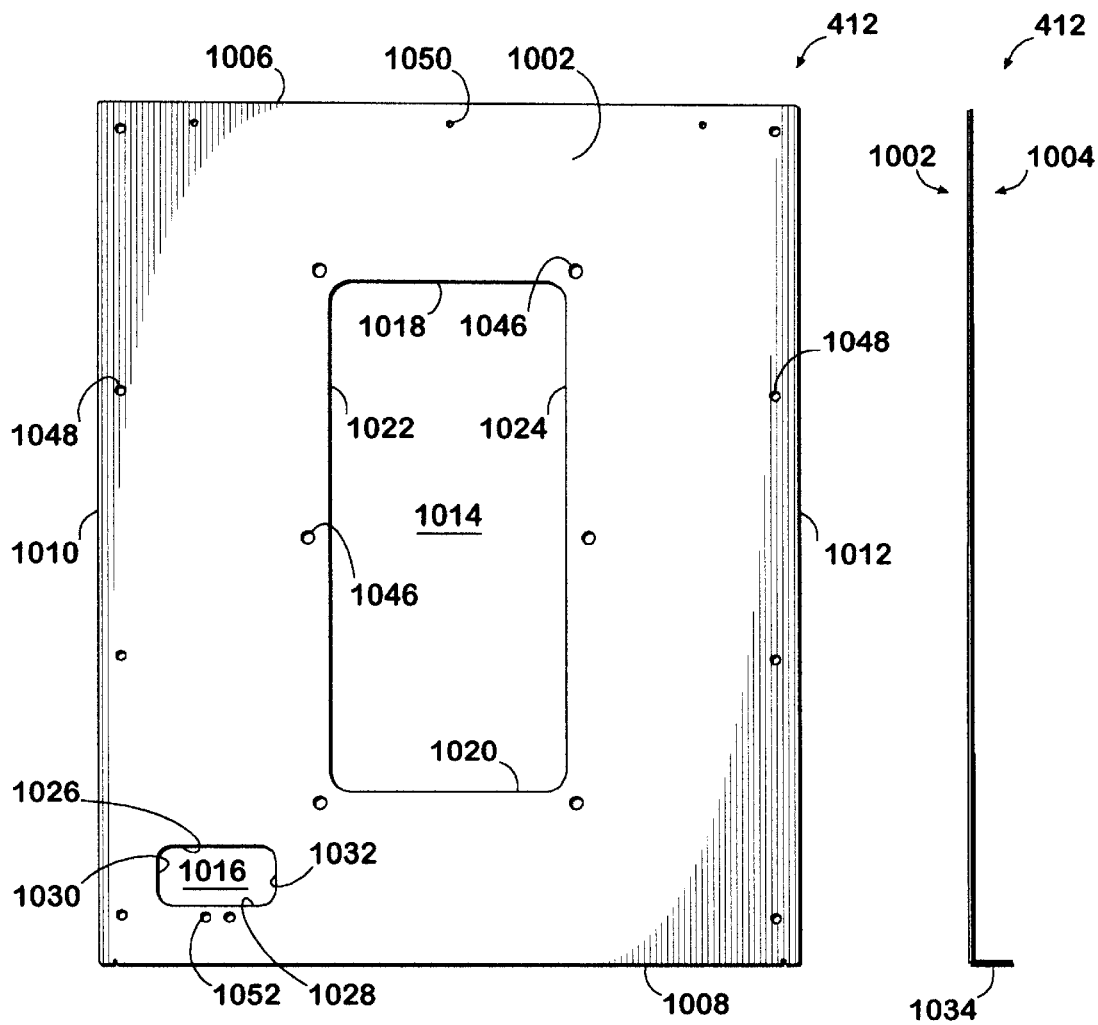
FIG.10a  FIG.10b
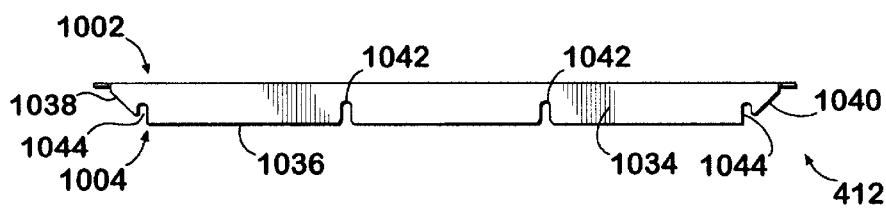
FIG.10c

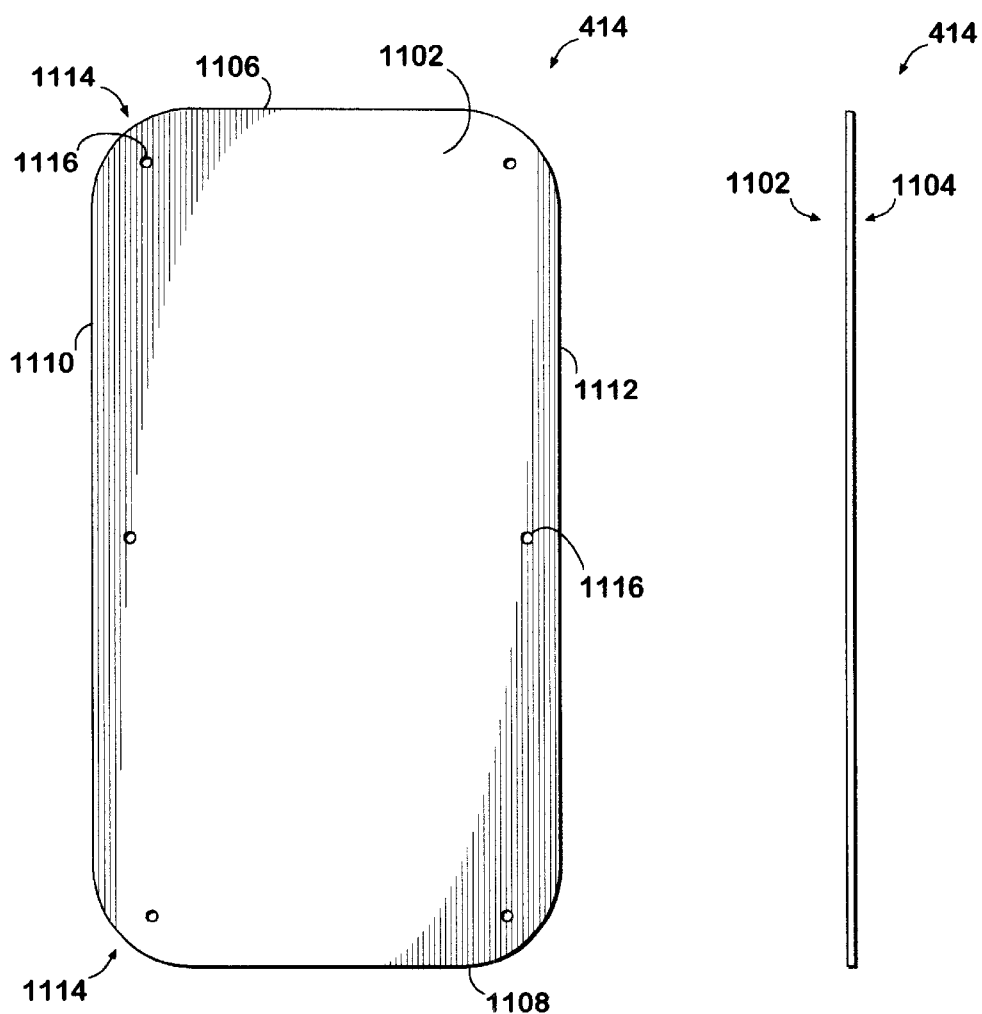
FIG.11a  FIG.11b
FIG.11c

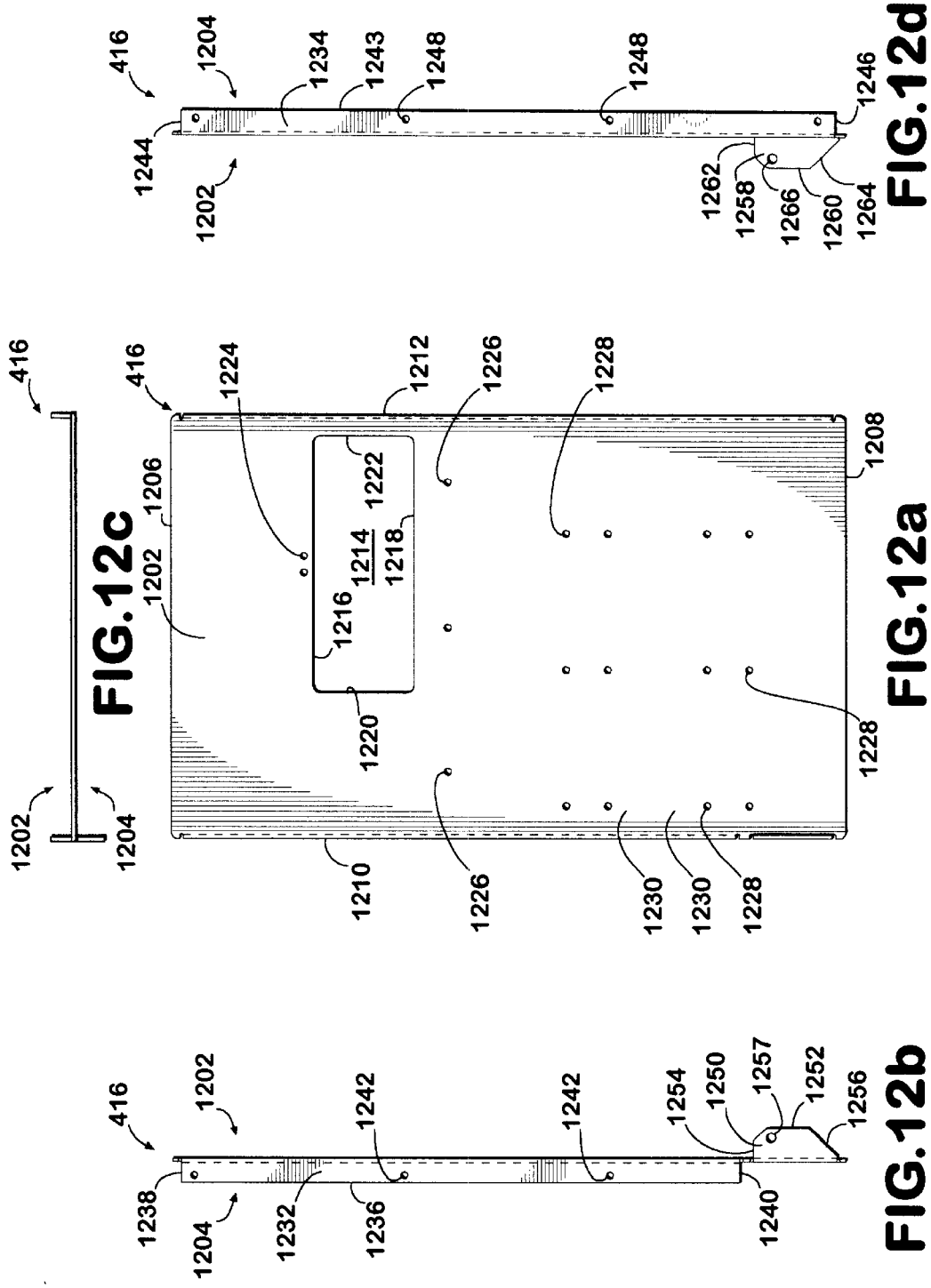

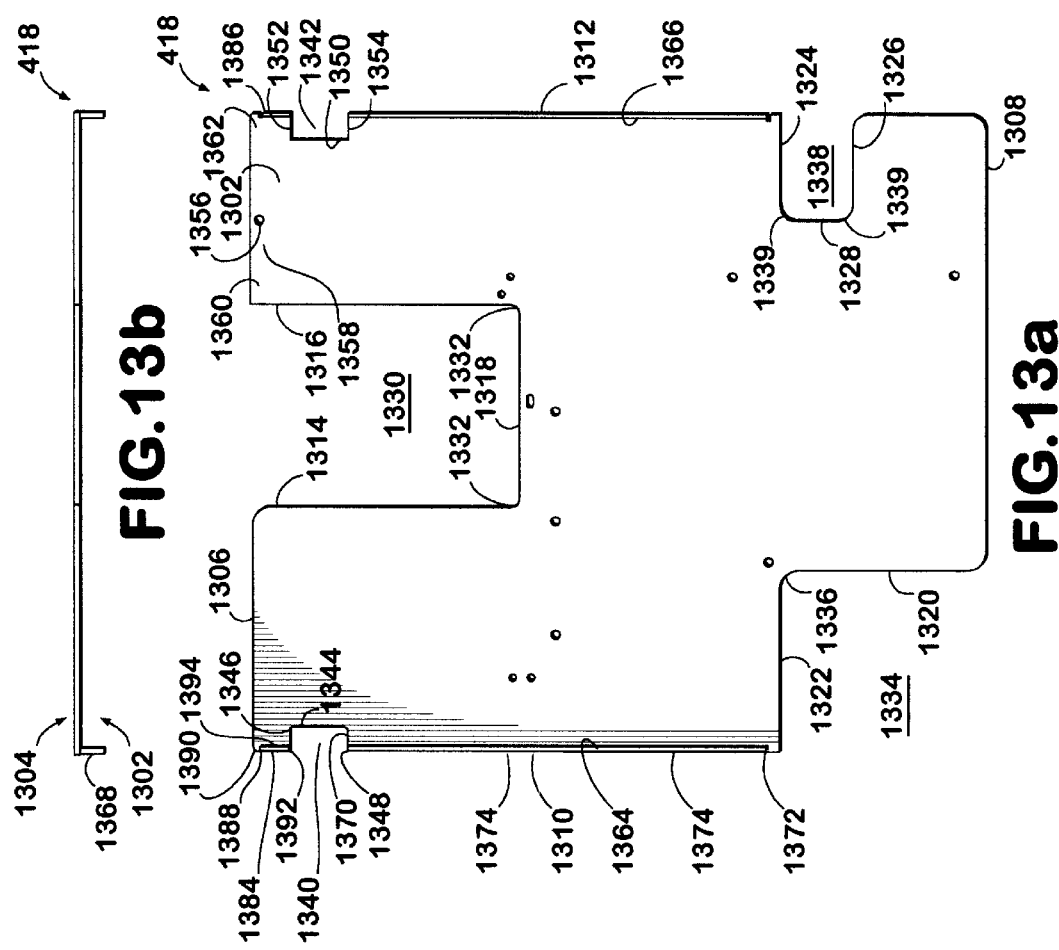

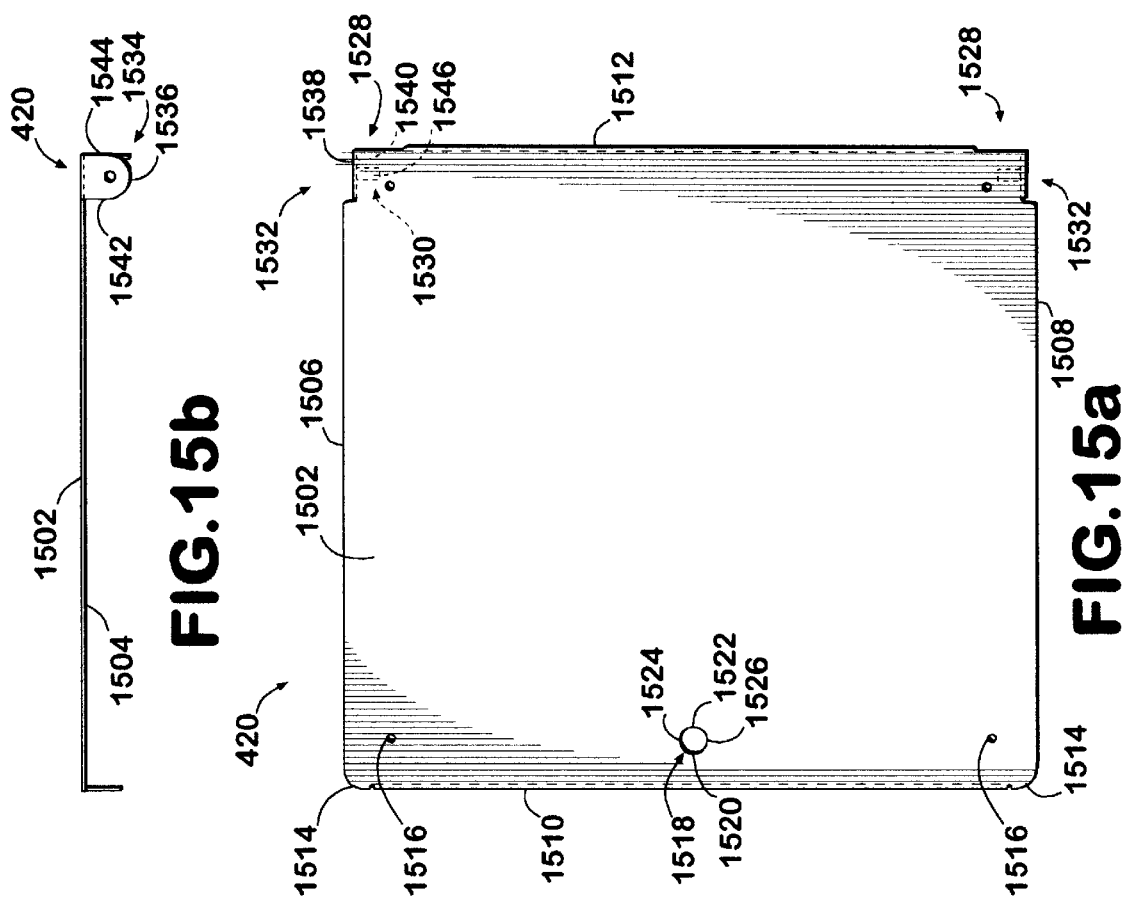

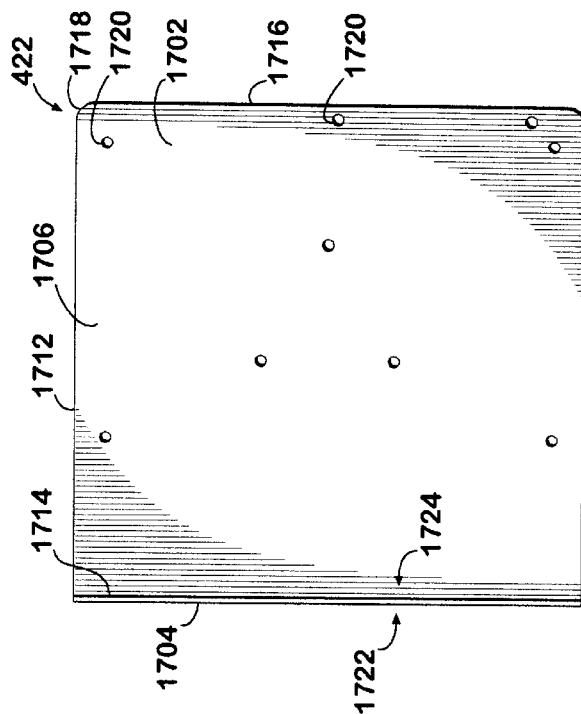
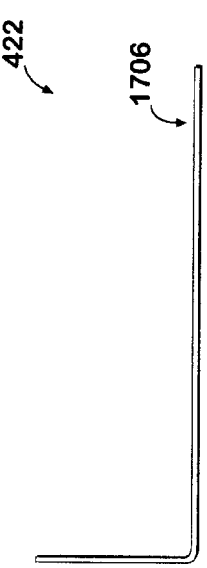
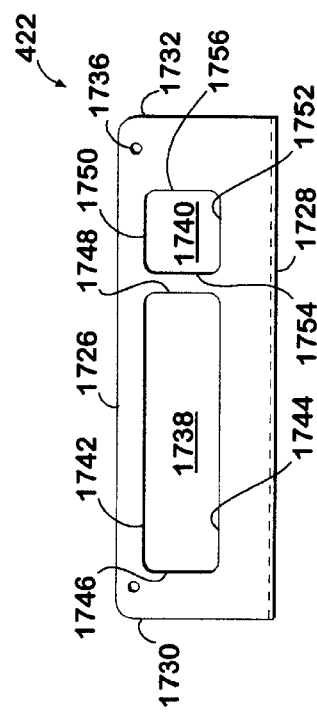

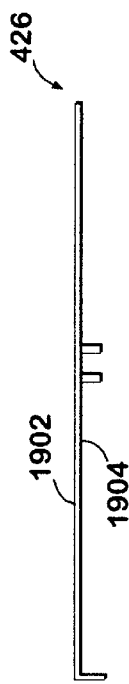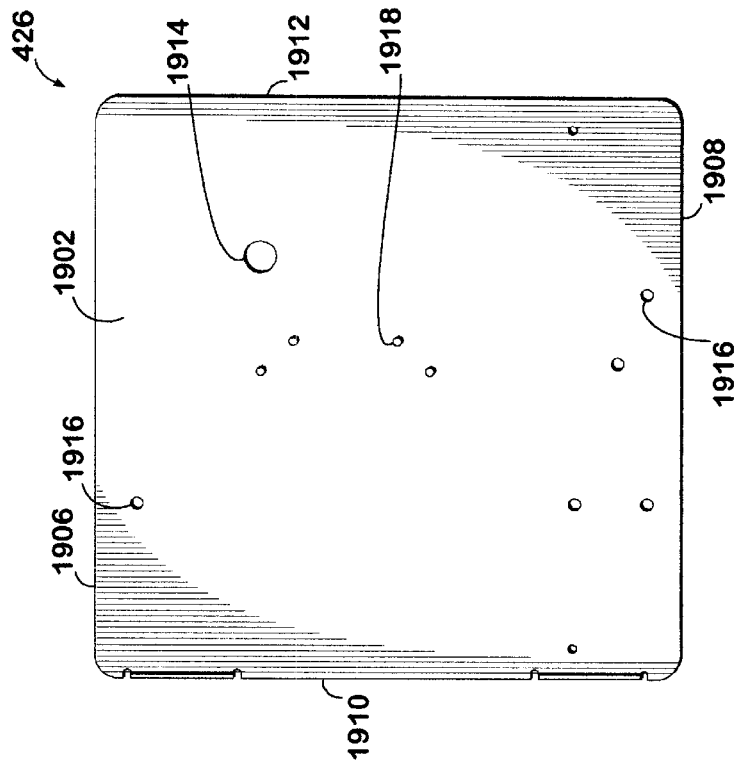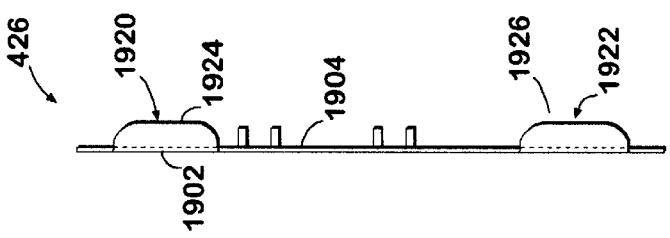

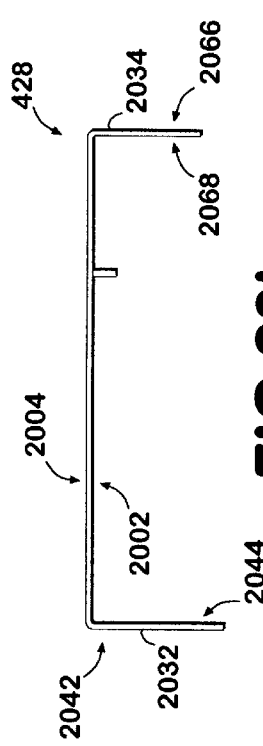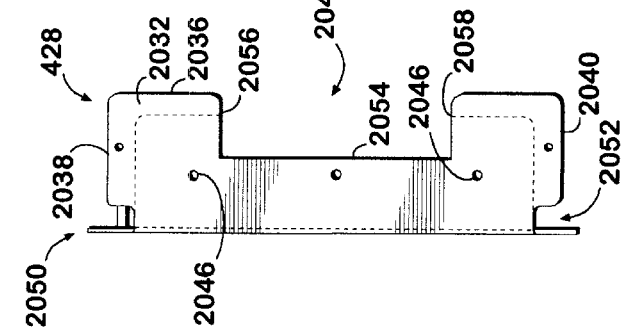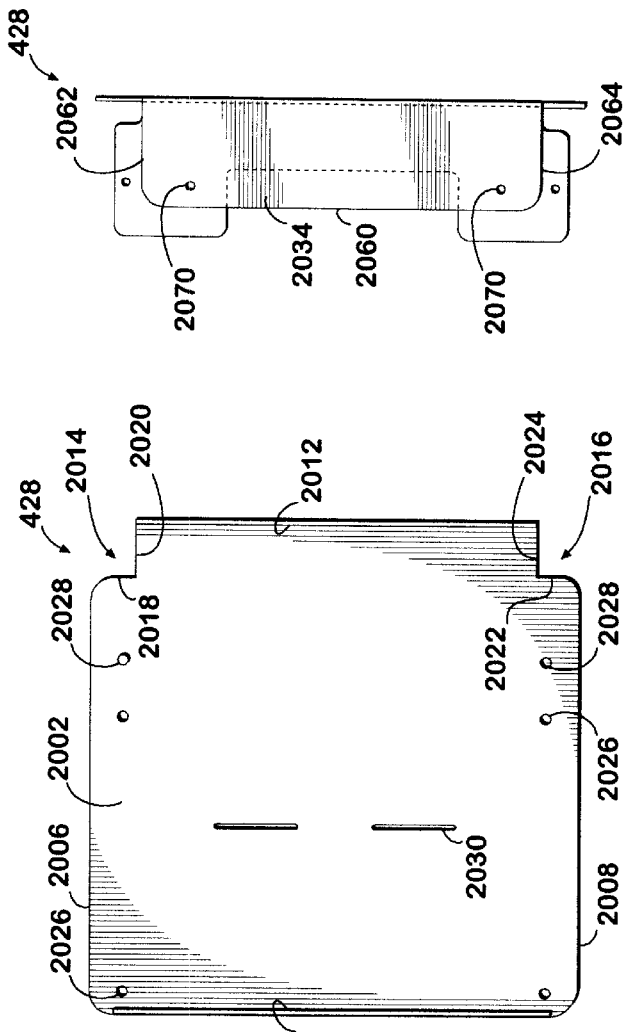

STORAGE SYSTEM FOR MOUNTING AND SECURING A PORTABLE COMPUTER TO A VEHICLE

TECHNICAL FIELD

The present invention relates generally to computer systems and relates more specifically to a system and apparatus for providing secure transportation and vehicular security for computer equipment.

BACKGROUND OF THE INVENTION

When a computer is transported by the maintenance or repair person in a truck or van, the computer is subjected to vibrations of the truck or van while on the road. Vibrations can damage the electrical and structural components of a computer. Computer repairs or replacements can be expensive and time consuming, especially when data or programming cannot be retrieved for a specific task.

In many instances, a portable or laptop computer remains in an unsecured position while inside a truck or van. While the truck or van is in motion, the truck or van can suddenly decelerate or brake. The rapid deceleration can cause the portable or laptop computer to become a projectile inside the truck or van. In such cases, the computer could cause serious injury or damage to people or objects inside the van or truck, as well as cause significant damage to the computer itself.

In other cases, an unsecured computer inside a truck or van can be subject to potential theft or vandalism. Portable and laptop computers are common targets for theft or vandalism. When a maintenance or repair person is working from the van or truck, it is common to leave the van or truck doors open for easier access to repair equipment or computers inside the van or truck. Unsecured portable or laptop computers are easy to remove from or can be subject to tampering in the open van or truck.

One attempt at securing a laptop or portable computer uses a pedestal and a base. The base is attached to the interior compartment of a vehicle, and the pedestal mounts to the base. The laptop or portable computer mounts to a docking station at the top of the pedestal. This configuration still subjects the laptop or portable computer to excessive vehicular vibration. Furthermore, the laptop or portable computer is exposed within the interior compartment of the vehicle. Even though the computer could be locked to the pedestal, the computer can still be removed from or can still be tampered with while the computer is mounted to the docking station.

In other cases, a portable computer mounted to a pedestal is inconvenient to use. A user may want to adjust the lateral or translational position of the portable computer relative to the user's seat. Since the pedestal can only be raised upward or lowered downward, a user can be greatly inconvenienced by the lack of mobility that portable computer mounted on a pedestal offers.

Thus, the need exists in the prior art for an improved system and apparatus for providing secure transportation for computer equipment. In addition, the need exists in the prior art for an improved system and apparatus for securing a portable computer inside a moving vehicle. Furthermore, the need exists in the prior art for an improved system and apparatus for portable security of computer equipment, such as in a stationary vehicle. And, the need exists in the prior art for an improved system and apparatus for increasing the convenience of using a mounted portable computer in a vehicle.

SUMMARY OF THE INVENTION

The present invention solves the problems described above in a system for mounting and securing a portable computer to a vehicle that provides security for a portable computer while the computer is transported, used, or stored in a work vehicle. The system secures the portable computer within a case providing security, accessibility, and protection for the computer. The system also secures peripheral devices, such as a printer, a modem, or external storage device, for the computer inside the case. The system increases the reliability of the computer and its peripheral devices by physically cushioning the computer from most vibrations and sudden decelerations encountered while the work vehicle is in motion. And, the system increases the convenience of using a mounted portable computer inside a vehicle.

Generally described, the invention is a system and apparatus for mounting and securing a portable computer in a vehicle. The invention includes a platform, a case, and a means for selectively prohibiting access to a computer on the platform. The case is configured to mount to the vehicle so that the case remains in a stationary position while the vehicle is in motion. When the vehicle is in a stationary or parked position, the case can be moved relative to the vehicle through a range of positions for easier user access or visibility. The platform mounts to the case so the platform can rotate with respect to the case. The platform is sized to receive a laptop or portable computer. Means operatively associated with the case for selectively prohibiting access to the computer mounted on the platform prevents unauthorized removal of the computer from the platform.

In another aspect of the invention, the case is secured to the vehicle by the mounting plate and base plate combination, where the mounting plate is fixed to the vehicle, and the base plate forms the bottom side of the case. The base plate mounts to the mounting plate providing translational movement of the case relative to the vehicle. Means operatively associated with the case for selectively prohibiting access to the computer can be a lid or large door. While the computer is in use, the lid can be stowed so that a user can access the laptop or portable computer mounted to the platform. When the computer is in a stowed position, the lid can cover a portion of the computer to reduce the visibility of the computer mounted on the platform. To secure the computer within the case, the lid can be locked within in a closed position with respect to the case and platform to prevent removal of the computer from the platform.

More specifically, a swivel connects the platform to the case, and permits the platform to be rotated through a range of positions with respect to the case. The swivel can be a conventional swivel mechanism or similar type device for rotating the platform with respect to the case.

In addition, the platform can be a docking station for a laptop or portable computer. The docking station can provide connection means for the laptop or portable computer to a computer peripheral device. Computer peripheral devices can include an antenna, a printer, modem, scanner, an input/output device, or other similar type devices.

In yet another aspect of the invention, storage compartments or shelves divide the interior of the case to provide storage or mounting options for the user. Computer peripheral devices mount to or within the storage compartments or shelves to add functionality to the computer.

Other objects, features, and advantages of the present invention will become apparent upon reading the following specification, when taken in conjunction with the drawings and the appended claims.

BRIEF DESCRIPTION OF THE DRAWINGS

FIG. 3a illustrates a top view of a mounting base for a storage system shown in FIG. 2.

FIG. 3b illustrates a rear edge view of a mounting base for a storage system shown in FIG. 2.

FIG. 3c illustrates a right edge view of a mounting base for a storage system shown in FIG. 2.

FIG. 4b illustrates a perspective view of internal components of a storage system shown in FIG. 4a.

FIG. 5a illustrates a top view of a base plate for a storage system in FIG. 2.

FIG. 5b illustrates a right edge view of a base plate for a storage system in FIG. 2.

FIG. 6a illustrates a front view of a driver's side panel for a storage system shown in FIG. 2.

FIG. 6b illustrates a left edge view of a driver's side panel for a storage system shown in FIG. 2.

FIG. 6c illustrates a right edge view of a driver's side panel for a storage system shown in FIG. 2.

FIG. 6d illustrates a top edge view of a driver's side panel for a storage system shown in FIG. 2.

FIG. 6e illustrates a bottom edge view of a driver's side panel for a storage system shown in FIG. 2.

FIG. 7a illustrates a front view of a front panel for a storage system shown in FIG. 2.

FIG. 7b illustrates a right edge view of a front panel for a storage system shown in FIG. 2.

FIG. 7c illustrates a bottom edge view of a front panel for a storage system shown in FIG. 2.

FIG. 8a illustrates a front view of a front bottom panel for a storage system shown in FIG. 2.

FIG. 8b illustrates a right edge view of a front bottom panel for a storage system shown in FIG. 2.

FIG. 8c illustrates a bottom edge view of a front bottom panel for a storage system shown in FIG. 2.

FIG. 9a illustrates a front view of a passenger's side panel for a storage system shown in FIG. 2.

FIG. 9b illustrates a left edge view of a passenger's side panel for a storage system shown in FIG. 2.

FIG. 9c illustrates a right edge view of a passenger's side panel for a storage system shown in FIG. 2.

FIG. 9d illustrates a top edge view of a passenger's side panel for a storage system shown in FIG. 2.

FIG. 9e illustrates a bottom edge view of a passenger's side panel for a storage system shown in FIG. 2.

FIG. 10a illustrates a front view of a back panel for a storage system shown in FIG. 2.

FIG. 10b illustrates a right edge view of a back panel for a storage system shown in FIG. 2.

FIG. 10c illustrates a bottom edge view of a back panel for a storage system shown in FIG. 2.

FIG. 11a illustrates a front view of a side access panel for a storage system shown in FIG. 2.

FIG. 11b illustrates a right edge view of a side access panel for a storage system shown in FIG. 2.

FIG. 11c illustrates a bottom edge view of a side access panel for a storage system shown in FIG. 2.

FIG. 12a illustrates a front view of a passenger's side divider for a storage system shown in FIG. 2.

FIG. 12b illustrates a left edge view of a passenger's side divider for a storage system shown in FIG. 2.

FIG. 12c illustrates a top edge view of a passenger's side divider for a storage system shown in FIG. 2.

FIG. 12d illustrates a right edge view of a passenger's side divider for a storage system shown in FIG. 2.

FIG. 13a illustrates a front view of a back divider for a storage system shown in FIG. 2.

FIG. 13b illustrates a top edge view of a back divider for a storage system shown in FIG. 2.

FIG. 13c illustrates a right edge view of a back divider for a storage system shown in FIG. 2.

FIG. 15a illustrates a top view of a lid for a storage system shown in FIG. 2.

FIG. 15b illustrates a front edge view of a lid for a storage system shown in FIG. 2.

FIG. 15c illustrates a left edge view of a lid for a storage system shown in FIG. 2.

FIG. 17a illustrates a top view of a platform or CPU tray for a storage system shown in FIG. 2.

FIG. 17b illustrates a front edge view of a platform or CPU tray for a storage system shown in FIG. 2.

FIG. 17c illustrates a right edge view of a platform or CPU tray for a storage system shown in FIG. 2.

FIG. 19a illustrates a top view of a printer tray for a storage system shown in FIG. 2.

FIG. 19b illustrates a right edge view of a printer tray for a storage system shown in FIG. 2.

FIG. 19c illustrates a front edge view of a printer tray for a storage system shown in FIG. 2.

FIG. 20a illustrates a top view of a drawer for a storage system shown in FIG. 2.

FIG. 20b illustrates a right edge view of a drawer for a storage system shown in FIG. 2.

FIG. 20c illustrates a front edge view of a drawer for a storage system shown in FIG. 2.

FIG. 20d illustrates a rear edge view of a drawer for a storage system shown in FIG. 2.

DETAILED DESCRIPTION OF EMBODIMENTS OF THE INVENTION

The invention may be embodied in a storage system for a portable computer. The box provides a secure case for the computer while the vehicle is stationary or in motion. When the vehicle is stationary, the computer can be secured within the case to prevent theft of the computer. When the vehicle is in motion, the computer is secured within the case to cushion the computer from vibrations or sudden deceleration of the vehicle.

Figure 1:
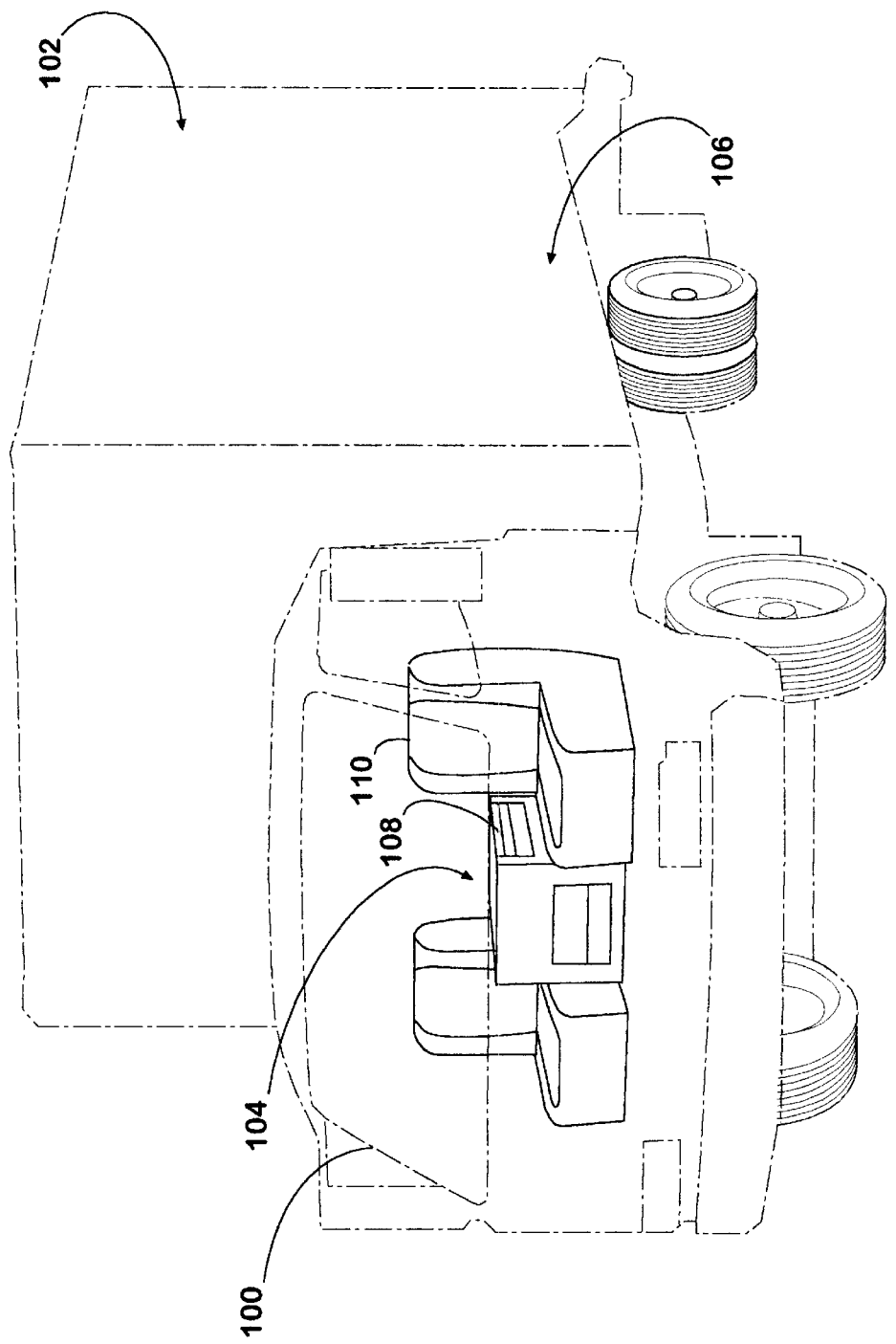
FIG. 1 illustrates an operating environment of disclosed embodiments of the invention.

Referring now to the drawings, in which like numerals indicate like elements throughout the several views, FIG. 1 illustrating an operating environment of disclosed embodiments of the invention. A vehicle 100 provides an interior compartment 102 for mounting a storage system 104 for a portable computer. The storage system 104 mounts directly to the interior compartment 102 so that the storage system 104 remains in a stationary position while the vehicle 100 is in motion. Typically, the storage system mounts to the floor 106 of the interior compartment 102. The storage system 104 provides an enclosure for a portable computer 108 to be installed within or upon. The storage system 104 secures the computer 108 and protects the computer 108 from vehicular vibrations while the vehicle 100 is in motion.

When the vehicle 100 is stationary or in a parked position, the storage system 104 can move through a limited range of positions relative to the vehicle 100 for easier accessibility by a user. The storage system 104 protects the computer 108 from potential theft or vandalism while the vehicle 100 is in a stationary or parked position.

In the configuration shown, the storage system 104 mounts to the floor 106 of the interior compartment 102 towards the front portion of the vehicle 100. For example, the storage system 104 can be mounted in the interior compartment 102 of the vehicle 100, such as towards the front of the vehicle 100 between a driver's side seat 110 and a passenger's side seat 112. A storage system 104 can also be mounted to other areas of the interior compartment 102 of the vehicle 100, such as the rear portion of the vehicle behind either the driver's side seat 110 and a passenger's side seat 112.

Figure 2:
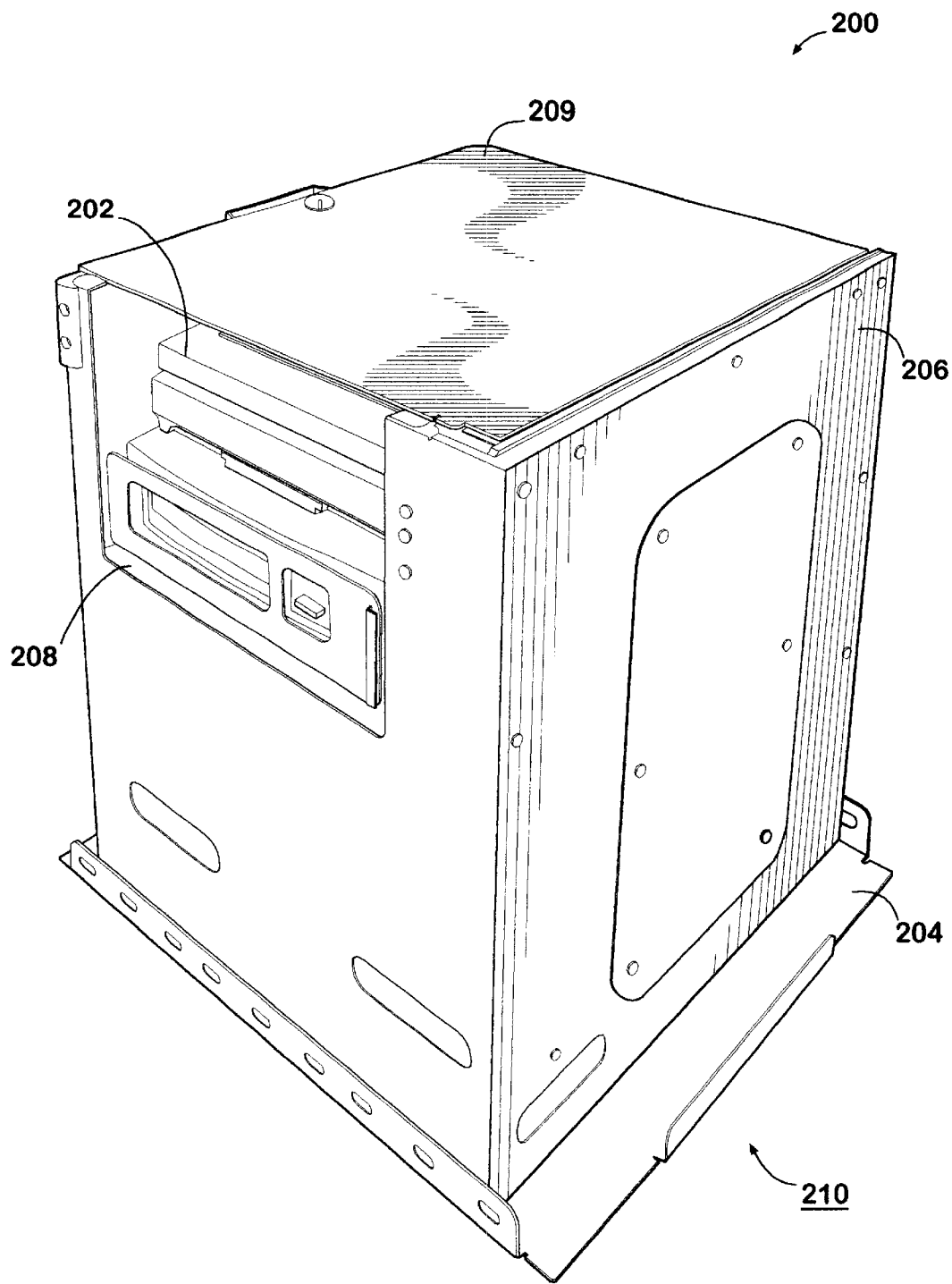
FIG. 2 illustrates a perspective view of a storage system for a portable computer.

FIG. 2 illustrates a perspective view of a storage system 200 for a portable computer 202. The storage system 200 includes a mounting base 204, a case 206, a platform 208, a swivel (not shown), and a lid 209. The mounting base 204 mounts to a space in an interior compartment (shown as 102 in FIG. 1) of a vehicle (shown as 100 in FIG. 1). Typically, the mounting base 204 mounts to a floor 210 of the interior compartment 102. The mounting base 204 can be configured to mount to any other surface within the interior compartment 102, such as the wall, or ceiling. The mounting base 204 is configured to provide a fixed position for the storage system 200 within the interior compartment 102 while the vehicle 100 is in motion. When the vehicle 100 is stationary or in a parked position, the storage system 200 can be positioned in a limited range of positions for easier user access.

The case 206 is sized so that a conventional laptop or portable computer 202 fits within the case. Typically, the case 206 is a box-shaped enclosure for housing a laptop or portable computer 202. The case 206 can be configured into different shapes and sizes depending upon the size and space constraints of the interior compartment 102 of the vehicle 100, and the size of the laptop or portable computer 202.

A platform 208 mounts to the case 206. The platform 208 is configured to receive a conventional wireless laptop or portable computer 202. The platform 208 provides electrical and locking connections for the computer 202 when the computer 202 is mounted within the platform 208. Typically, the platform 208 mounts within the case 206. The platform 208 can be mounted anywhere on the case 206 as long as the laptop or portable computer 202 can be secured in a locked fashion. The platform 208 can be a conventional computer cradle 208 configured for receiving and mounting a wireless laptop or portable computer.

A swivel (not shown) connects the bottom of the platform 208 to the case 206. The swivel is configured to rotate the platform 208 with respect to the case 206. The swivel provides a degree of rotation for the user to turn a computer 202 mounted within the platform 208 to a more convenient position. For example, exterior light can create a glare on a monitor (not shown) connected to the computer 202 making the monitor unreadable to the user. By rotating the platform 208 with the monitor and computer 202, the user can adjust the monitor so that there is relatively less glare on the monitor. The swivel can be a conventional swivel configured for rotating one part of the swivel relative to an opposing part of the swivel.

The lid 209 removably mounts to the case 206. When the lid is in an open position, the lid 209 provides user access to the computer 202 inside the case 206. As shown, the lid 209 can be secured in a closed position to provide protection of The computer 202 from potential theft or tampering.

FIGS. 3a–c illustrate a mounting base 204 as shown in FIG. 2. FIG. 3a shows a top view of the mounting base 204, FIG. 3b shows a front side view of the mounting base 204, and FIG. 3c shows a right side view of the mounting base 204. The mounting base 204 is a rectangular-shaped piece manufactured from conventional 11 gauge steel. The mounting base 204 includes a top side 302 opposing a bottom side 304, a front edge 306 opposing a rear edge 308, and a left edge 310 opposing a right edge 312. The top side 302 is configured for mounting the case 206, and the bottom side 304 is configured for mounting to an interior compartment (shown in FIG. 1 as 102) of a vehicle (shown in FIG. 1 as 100).

The mounting base 204 is approximately 0.075 inches thick measured from the top side 302 to the bottom side 304 of the mounting base 204. A series of ten raised circular protrusions 314 extend from the bottom side 304 of the mounting base 204. The protrusions 314 are approximately 3" in diameter and extend approximately 0.4 inches from the bottom side 304 of the mounting base 204. A corresponding mounting slot 316 is machined in the center portion of each protrusion 314. The mounting slots 316 are sized to receive mounting bolts (not shown) through the top side 302 of the mounting base 204. Each mounting slot 316 is approximately 1.2 inches in length and approximately 0.2 inches wide.

The front 306 and rear edges 308 of the mounting base 204 have center portions that extend substantially perpendicular from the top side 302 of the mounting base 204. The center portions of the front 306 and rear edges 308 extend approximately 1.9 inches from the top side 302 of the mounting base 204. The center portions of the front 306 and rear edges 308 begin approximately 1.1 inches from the left edge 310, and terminate approximately 1.3 inches from the right edge 312. A series of holes 318 is machined through the center portions of the front edge 306 and the rear edge 308. These holes 318 are sized to receive mounting bolts (not shown) that pass through the mounting base 204 and connect to the case 206. The holes 318 are approximately 0.7 inches in diameter.

The right edge 312 of the mounting base 204 has a center portion that extends substantially perpendicular from the top side 302 of the mounting base 204. The center portion of the right edge 312 is centered between the front 306 and rear edges 308, and is approximately 9.0 inches wide. The center portion extends approximately 1.2 inches from the top side 302 of the mounting base 204.

When the case 206 mounts to the top side 302 of the mounting base 204, the case 206 can be moved relative to the mounting base 204 and selectively secured in a single position. The mounting base 204 is designed so that when the case 206 is mounted to the mounting base 204, the case 206 can be secured in a single position while the vehicle 100 is in motion, or alternatively, when the vehicle 100 is stationary or in a parked position, the case 206 can be moved through a limited range of positions. Other types of devices can be used as a mounting base 204 for a case 206, including but not limited to, right angle braces or other devices that can be used to mount directly to the interior compartment 102 of a vehicle 100. For example, a mounting base 204 connects to a conventional track or swivel (not shown) installed on the floor (shown in FIG. 2 as 210) of an interior compartment 102 within a vehicle 100.

Figure 4A:
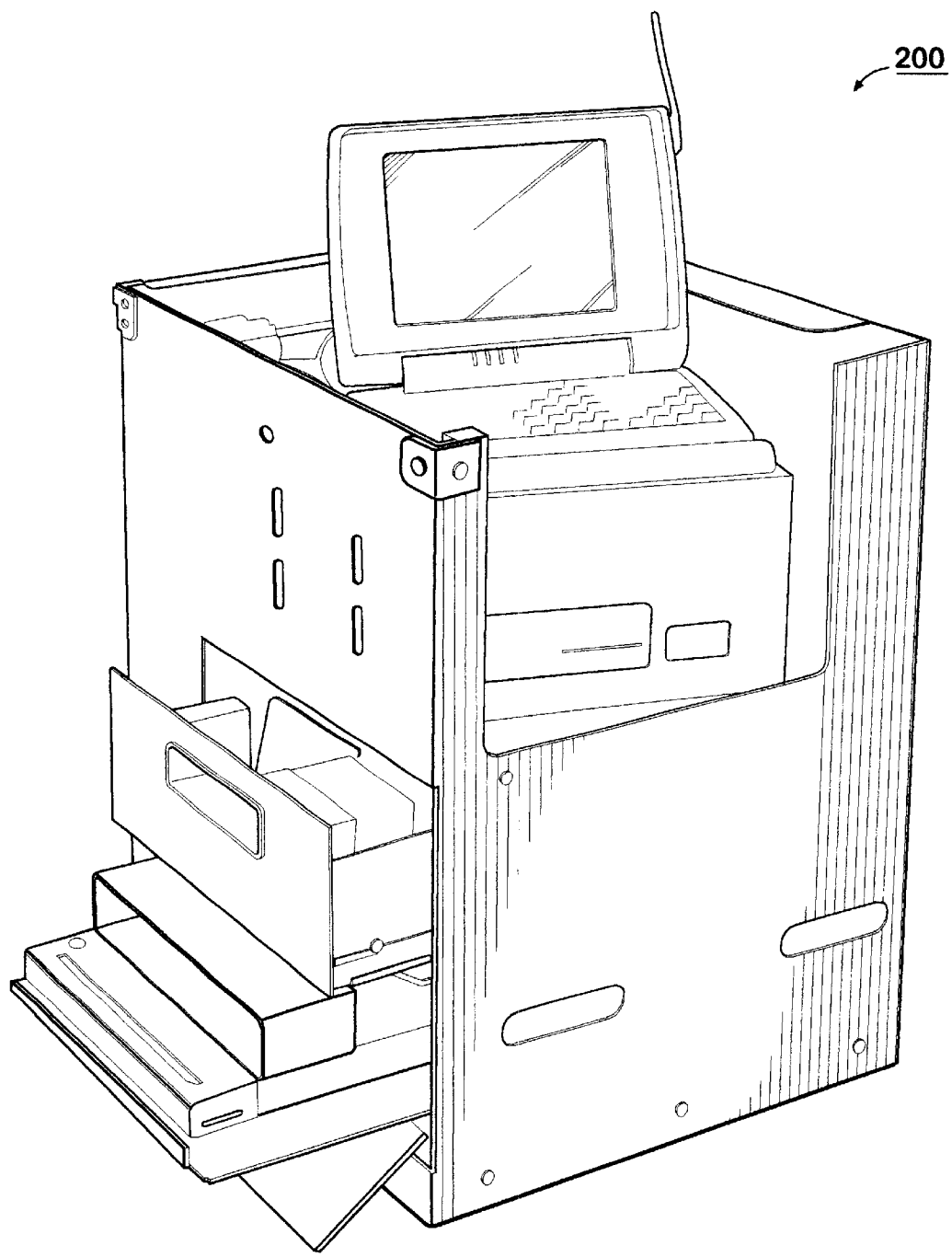
FIG. 4a illustrates a perspective view of a storage system shown in FIG. 2.
Figure 4B:
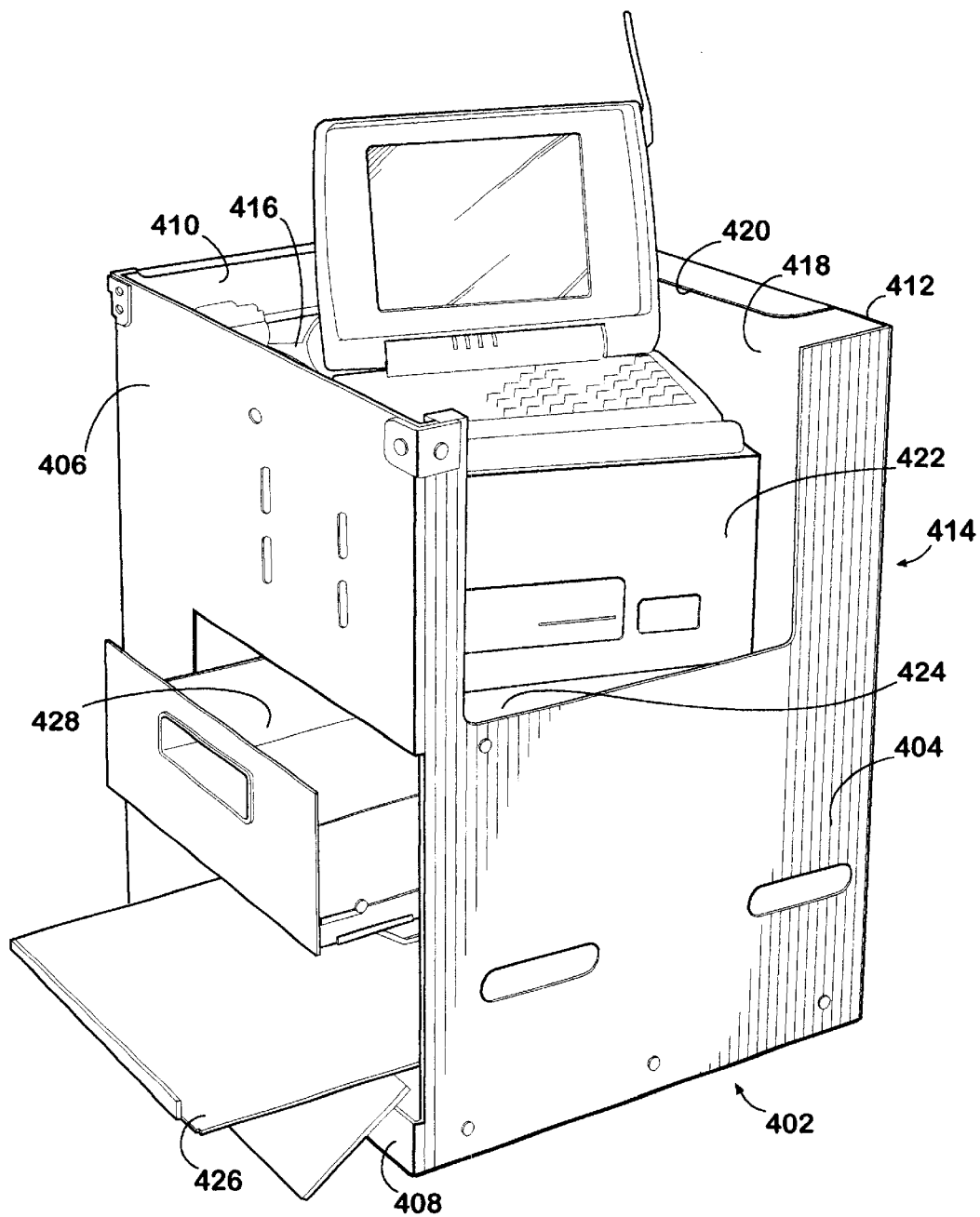

FIG. 4a shows a perspective view of a storage system 200 with the lid in an open position. FIG. 4b shows the assembly of case components illustrated in FIGS. 5–13 and FIGS. 15–20. The case 206 includes a base plate 402, a driver's side panel 404, a front panel 406, a front panel bottom 408, a passenger's side panel 410, a back panel 412, a side access panel 414, a passenger's side divider 416, a back divider 418, and a lid 420. The base plate 402 forms the horizontal bottom side of the case 206. Four relatively larger panels, the driver's side panel 404, the front panel 406, the passenger's side panel 410, and the back panel 412 form the vertical sides of the case 206. The driver's side panel 404 opposes the passenger's side panel 410, and the front panel 406 opposes the back panel 412. Two relatively smaller panels, the front panel bottom 408 and the side access panel 414 cover portions of the front and back vertical sides of the case 206, where the front panel bottom 408 opposes the side access panel 414. Internal panels, such as the passenger's side divider 416, and the back divider 418 vertically divide the interior space of the case 206. The lid 420 forms the horizontal top of the case 206 so that lid 420 opposes the base plate 402, when the lid 420 is in the closed position. Other components inside the case include a platform 422 or CPU tray, a computer shelf 424, a printer shelf 426, and a drawer 428. These internal components are horizontally positioned within the case 206 to further sub-divide the internal space of the case 206.

Each of the case components 402–420 and internal components 422–428 is manufactured from conventional 11 or 14 gauge steel. Many of the components 402–428 have extended edges that correspondingly fit together with adjacent components. The adjacent components 402–428 have steel studs that fit within notches machined into the extended edges. The components 402–428 are then fastened together by steel bolts, rivets, or similar types of fasteners.

FIGS. 5–13 illustrate components of a case 206 shown in FIG. 2, and FIGS. 15–20 illustrate internal components of a case 206. FIGS. 5a–b illustrate a base plate 402 as shown in FIG. 4b. FIG. 5a shows a top view of the base plate 402, and FIG. 5b shows a right edge view of the base plate 402. The base plate 402 forms the bottom side of the case 206, and mounts to the top side 302 of the mounting base 206 in a secure manner so that the case 206 can be fixed in a single position while the vehicle 100 is in motion. The base plate 402 is a rectangular-shaped piece of conventional 14 gauge steel with a top side 502 opposing a bottom side 504, a front edge 506 opposing a rear edge 508, and a left edge 510 opposing a right edge 512. The base plate 402 is approximately 0.075 inches thick from the top side 502 to the bottom side 504, and approximately 15.0 inches from the front edge 506 to the rear edge 508, and approximately 22.5 inches wide from the left edge 510 to the right edge 512.

A series of fourteen pin studs 514 extends from the top side 502 of the base plate 402. The pin studs 514 are configured around the outer periphery of the base plate 402, with three pin studs 514 near the front 506 and rear edges 508, and four pin studs 514 near the left 510 and right edges 512. The three pin studs 514 nearest the front 506 and rear edges 508 are spaced apart by approximately 7.0 inches, with approximately 1.3 inches spacing to the left 510 and right edges 512. The four pin studs 514 nearest the left 510 and right edges 512 are spaced apart by approximately 5.1 inches with approximately 1.3 inches spacing to the front 506 and rear edges 508. The pin studs 514 are steel studs connected to the base plate 402 by conventional welding procedures.

FIGS. 6a–e illustrate a driver's side panel 404 as shown in FIG. 4b. FIG. 6a shows a front view of the driver's side panel 404, FIG. 6b shows a left edge view of the driver's side panel 404, FIG. 6c shows a right edge view of the driver's side panel 404, FIG. 6d shows a top edge of the driver's side panel 404, and FIG. 6e shows a bottom edge view of the driver's side panel 404. The driver's side panel 404 is a U-shaped piece configured with an opening 602 in the upper portion of the panel 404. The driver's side panel 404 has a top edge 604 opposing a bottom edge 606, a left edge 608 opposing a right edge 610, a left interior edge 612 opposing a right interior edge 614, and a top interior edge 616. The opening 602 is formed by the space between the left interior edge 612 and the right interior edge 614, and bordered on the bottom by the top interior edge 616. The driver's side panel 404 is manufactured from conventional 14 gauge steel approximately 0.075 inches thick. The driver's side panel 404 measures approximately 19 inches high from the top edge 604 to the bottom edge 606, and approximately 24 inches long from the left edge 608 to the right edge 610.

The opening 602 between the left interior edge 612 and the right interior edge 614 of the driver's side panel 404 permits user access to the laptop or portable computer 202 inside the case 206. The opening 602 is approximately 8.8 inches high measured from the top edge 604 to the top interior edge 616 of the panel 404, and approximately 11.4 inches wide between the left interior edge 612 to the right interior edge 614 of the panel 404.

A left side arm 618 is formed between the left interior edge 612 and the left edge 608, measuring approximately 1.4 inches wide from the interior left edge 612 to the left edge 608 of the driver's side panel 404. A similarly-shaped right side arm 620 is formed between the right interior edge 614 and the right edge 610, measuring approximately 3.5 inches wide between the right interior edge 614 and the right edge 610.

Two relatively small portals 622 are located in the lower portion of the driver's side panel 404. The small portals 622 ventilate heat generated by electrical equipment inside the case 206 by permitting air to circulate into the case 206. The small portals 622 measure approximately 4 inches wide and approximately 1.0 inches high.

The driver's side panel 404 includes a front side 624 and a bottom side 626. The left edge 608, bottom edge 606, and right edge 610 of the driver's side panel 404 have perpendicular extensions 628, 630, 632 that connect to the corresponding front panel 406, front panel bottom 408, back panel 412, and base plate 402 panels. The left edge, bottom edge, and right edge extensions 628, 630, 632 extend substantially perpendicular from the bottom side 626 of the driver's side panel 404. The left edge extension 628 extends approximately 1.0 inch from the bottom side 626 of the driver's side panel 404. The bottom edge extension 630 extends approximately 1.0 inch from the bottom side 626 of the driver's side panel 404. The right edge extension 632 extends approximately 1.0 inch from the bottom side 624 of the driver's side panel 404. The corners of each extension 628, 630, 632 are beveled at approximately a 45 degree angle. A series of holes 633 machined into the extensions 628, 630, 632 are sized to receive corresponding bolts (not shown) to connect adjacent panels 408, 412 to the driver's side panel 404. A series of notches 635 in the bottom edge extension 630 are sized to receive corresponding pin studs (not shown) on the base plate 402 to connect the driver's side panel 404 to the base plate 402.

The top edge 604 of the left side arm 616 and right side arm 618 have perpendicular extensions 634, 636 that can support the adjacent lid 420 of the case 206 when the lid 420 is in a closed position. The perpendicular extensions 634, 636 are rounded tab-shaped pieces that extend substantially perpendicular to the bottom side 626 of the driver's side panel 404. The left side arm extension 634 is approximately 1.0 inch wide, extending approximately 0.8 inches from the bottom side 626 of the driver's side panel 404, and is spaced approximately 0.4 inches from the left edge 608 of the panel 404. The right side arm extension 636 is approximately 1.3 inches wide, extending approximately 0.8 inches from the bottom side 626 of the driver's side panel 404, and is spaced approximately 2.2 inches from the right edge 610 of the panel 404. The corners of each extension 634, 636 are rounded to approximately a 0.4 inch radius.

A series of holes 638 is machined into the front side 622 of the driver's side panel 404 to receive bolts (not shown) that connect the panel 404 to adjacent panels 408, 412 and to internal components 424–428. A series of pin studs 640 are connected to the bottom side 624 of the driver's side panel 404 to connect the panel 404 to adjacent panels 408, 412.

FIGS. 7a–c illustrate a front panel 406 as shown in FIG. 4b. FIG. 7a shows a front view of the front panel 406, FIG. 7b shows a right edge view of the front panel 406, and FIG. 7c shows a bottom edge view of the front panel 406. A front panel 406 is an inverted L-shaped piece that mounts between the upper portion of the left edge 608 of the driver's side panel 404 and the passenger's side panel 410. The front panel 406 includes a front side 702 opposing a bottom side 704, a top edge 706 opposing a bottom edge 708, a left edge 710 opposing a right edge 712, a right interior edge 714, and a bottom interior edge 716.

The front panel 406 is manufactured from conventional 14 gauge steel and is approximately 0.075 inches thick measured from the front side 702 to the bottom side 704. The front panel 406 measures approximately 21.9 inches high from the top edge 706 to the bottom edge 708, and approximately 18.0 inches wide from the left edge 710 to the right edge 712. The lower portion of the front panel 406 extends down the left edge 710 and the right interior edge 714 to form a left side arm 718.

The left side arm 718 measures approximately 5.1 inches wide from the left edge 710 to the right interior edge 714. The upper portion of the front panel 406 extends across the length of the top edge 706 to form an upper arm 720, and measures approximately 9.4 inches high from the top edge 706 to the bottom interior edge 716.

The bottom edge 708 of the front panel 406 has a lip 722 extending substantially perpendicular from the bottom side 704 of the front panel 406. The bottom edge lip 722 is configured to connect to the left edge (shown in FIG. 5a as 510) of the base plate (shown in FIG. 4b as 402). The lip 722 includes a left side 724 opposing a right side 726 and an outboard edge 728. The bottom edge lip 722 extends approximately 1.0 inches from the bottom side 704 of the front panel 406 to the outboard edge of the lip 722. The lip 722 measures approximately 4.2 inches wide from the left side 724 to the right side 726 of the lip 722.

A single rounded notch 730 in the center portion of the bottom edge lip 722 extends from the outboard edge 728 of the lip 722 towards the bottom edge 708 of the front panel 406. The notch 730 measures approximately 0.6 inches deep and is rounded to approximately a 0.13 inch radius. Corners 732 formed by the intersection of the outboard edge 728 with the left 724 and right sides 726 of the lip 722 are beveled at approximately a 45 degree angle.

A series of four ventilation openings 734 are positioned in the center portion of the upper arm 720 of the front panel 406. The ventilation openings 734 are configured to permit air to circulate into the case 206 to provide cooling air for electrical equipment, such as a portable computer 202 and printer inside the case 206. Each opening 734 measures approximately 1.4 inches high and 0.4 inches wide. A single small portal 736 is positioned in the center portion of the upper arm 720 above the ventilation openings 734. The small portal 736 is configured to permit access to a locking mechanism for the lid 420.

A series of bolt holes 738 is machined in the front side 702 of the front panel 406 to receive corresponding bolts (not shown) to connect adjacent panels 404, 410 and internal components 416 to the front panel 406.

FIGS. 8a–c illustrate a front panel bottom 408 as shown in FIG. 4b. FIG. 8a shows a front view of the front panel bottom 408, FIG. 8b shows a right side view of the front panel bottom 408, and FIG. 8c shows a bottom view of the front panel bottom 408. The front panel bottom 408 is a rectangular-shaped piece that mounts between the lower portion of the right interior edge 714 of the front panel 406 and the left edge 608 of the lower portion of the driver's side panel 404. The front panel bottom 408 is configured for vertically covering the lower portion of the case on the same side as the front panel 406. The front panel bottom 408 includes a top side 802 opposing a bottom side 804, a top edge 806 opposing a bottom edge 808, and a left edge 810 opposing a right edge 812.

The front panel bottom 408 is manufactured from conventional 14 gauge steel and is approximately 0.075 inches thick from the top side 802 to the bottom side 804. The front panel bottom 408 measures approximately 2.9 inches high from the top edge 806 to the bottom edge 808, and approximately 12.8 inches wide from the left edge 810 to the right edge 812.

The bottom edge 808 of the front panel bottom 408 has a lip 814 extending substantially perpendicular from the bottom side 804 of the front panel bottom 408. The lip 814 is configured to connect to the left edge 510 of the base plate 402. The lip 814 includes an outboard edge 816, and a left side 818 opposing a right side 820. The lip 814 extends approximately 1.02 inches substantially perpendicular from the bottom side 804 of the front panel bottom 408 to the outboard edge 816. The lip 814 extends approximately 12.0 inches across measured between the left side 818 and the right side 820 of the lip 814. The intersection of the left side 818 and the right side 820 of the lip 814 form corners 822 which are beveled at approximately a 45 degree angle. At the intersection of the left side and the right side 820 of the lip 814, a rounded notch 824 is machined into the lip 814. These rounded notches 824 measure approximately 0.25 inches wide and are approximately 0.55 inches deep measured from the outboard edge 816 of the lip 814 towards the bottom side 804 of the front panel bottom 408. A single notch 826 is machined into the center portion of the lip 814, extending approximately 0.55 inches deep measured from the outboard edge 816 of the lip 814 towards the bottom side 804 of the front panel bottom 408. The notches 824, 826 are sized to receive the pin studs 514 located at the front left portion of the base plate 402.

Two holes 828 are machined into the lip 814 to receive bolts (not shown) that connect the front panel bottom 408 to the base plate 402. The holes 824 are positioned towards the left 818 and right sides 820 of the lip 814. A series of holes 830 are machined in the upper portion of the front panel bottom 408 to receive corresponding bolts (not shown) connecting the front panel bottom 408 to mounting base 206. The holes 830 measure approximately 0.22 inches in diameter.

FIGS. 9*a–e* illustrates a passenger's side panel 410 as shown in FIG. 4*b*. FIG. 9*a* shows a front view of the passenger's side panel 410, FIG. 9*b* shows a left edge view of the passenger's side panel 410, FIG. 9*c* shows a right edge view of the passenger's side panel 410, FIG. 9*d* shows a top edge of the passenger's side panel 410, and FIG. 9*e* shows a bottom edge view of the passenger's side panel 410. The passenger's side panel 410 vertically mounts to the left edge 608 of the front panel 406 and to the right edge 914 of the back panel 412 to provide one side of the case 206. The passenger's side panel 410 is a rectangular-shaped piece configured with a large rectangular-shaped portal 902 in the upper portion of the panel 410. The passenger's side panel 410 has a front side 904 opposing a bottom side 906, a top edge 908 opposing a bottom edge 910, a left edge 912 opposing a right edge 914, a left interior edge 916 opposing a right interior edge 918, and a top interior edge 920 opposing a bottom interior edge 922.

The passenger's side panel 410 is made from conventional 14 gauge steel with an approximate thickness of 0.075 inches measured from the front side 904 to the bottom side 906 of the panel 410. The passenger's side panel 410 measures approximately 22.0 inches tall from the top edge 908 to the bottom edge 910, and approximately 22.4 inches wide from the left edge 912 to the right edge 914.

The space between the left interior edge 916 and the right interior edge 918 forms the vertical sides of the portal 902, and the top interior edge 920 and the bottom interior edge 922 form the horizontal sides of the portal 902. The portal 902 permits user access to the interior the case 206. The portal 902 is approximately 13.0 inches high measured from the top interior edge 920 to the bottom interior edge 922, and approximately 6.0 inches wide between the left interior edge 916 to the right interior edge 918 of the panel 410. The left interior edge 916 is spaced approximately 3.5 inches from the left edge 912 of the panel 410. The right interior edge 918 is spaced approximately 6.8 inches from the right edge 906 of the panel 410. The top interior edge 920 is spaced approximately 2.0 inches from the top edge 908 of the panel 410. The bottom interior edge 922 is spaced approximately 7.2 inches from the bottom edge 910 of the panel 410.

Two relatively smaller portals 924 in the lower left and right portions of the passenger's side panel 410 permit air to circulate into the case 206. The smaller portals 924 are rectangular-shaped and measure approximately 4 inches wide and 1 inch high.

The top edge 908, the left side edge 912, right side edge 914, and the bottom edge 910 extend substantially perpendicular from the bottom side 906 of the passenger's side panel 410, similar to edges shown in FIGS. 6–8. Each of the extended edges 926, 928, 930, 932 of the passenger's side panel 410 is configured for connecting to a corresponding adjacent case panel or interior wall panel. The top extended edge 926 includes an outboard edge 934, and a left side 936 opposing a right side 938. The top extended edge 932 extends approximately 0.75 inches measured from the outboard edge 934 to bottom side 910 of the passenger's side panel 410, and measures approximately 13.7 inches from the left side 936 to the right side 938 of the top extended edge 926. The top extended edge is spaced approximately 0.44 inches measured from the left side 936 to the left edge 912 of the panel 410, and approximately 2.2 inches measured from the right side 938 to the right edge 914 of the panel 410. The intersection of the outboard edge 934 with the left 936 and right sides 938 form corners 940 that are rounded to approximately a 0.40 inch radius.

The left side edge extension 928 includes an outboard edge 942, and a top side 944 opposing a bottom side 946. The left edge extension 928 extends approximately 1.0 inches from the bottom side 906 of the passenger's side panel 410 to the outboard edge 942, and approximately 21.5 inches from the top side 944 to the bottom side 946 of the left edge extension 928. The left edge extension 928 is spaced approximately 0.24 inches measured from the top side 944 of the extension 928 to the top edge 908 of the panel 410, and approximately 0.24 inches from the bottom side 946 of the extension 928 to the bottom edge 910 of the panel 410. Intersections 948 of the outboard edge 942 with the top 944 and bottom side 946 of the extension 928 are beveled at approximately a 45 degree angle. A series of holes 950 is machined in the left edge extension to receive bolts (not shown) to connect the passenger's side panel 410 to the adjacent front panel 406.

Similarly sized and shaped to the left side edge extension 928, the right side edge extension 930 includes an outboard edge 952, and a top side 954 opposing a bottom side 956. The right edge extension 930 extends approximately 1.0 inches from the bottom side 906 of the passenger's side panel 410 to the outboard edge 952, and approximately 21.5 inches from the top side 954 to the bottom side 956 of the right edge extension 930. The right edge extension 930 is spaced approximately 0.24 inches measured from the top side 954 of the extension 930 to the top edge 908 of the panel 410, and approximately 0.24 inches from the bottom side 956 of the extension 930 to the bottom edge 910 of the panel 410. Intersections 958 of the outboard edge 952 with the top 954 and bottom side 956 of the extension 930 are beveled at approximately a 45 degree angle. A series of holes 960 is machined in the right edge extension 930 to receive bolts (not shown) to connect the passenger's side panel 410 to the adjacent front panel 406.

Similarly sized and shaped to the bottom edge extension 814 in FIG. 8, the bottom edge extension 932 includes an outboard edge 962, and a left side 964 opposing a bottom side 966. The bottom edge extension 932 extends approximately 1.0 inches from the bottom side 906 of the passenger's side panel 410 to the outboard edge 962, and approximately 15.5 inches from the left side 954 to the right side 956 of the bottom edge extension 932. The right edge extension 932 is spaced approximately 0.44 inches measured from the left side 964 of the extension 932 to the left edge 912 of the panel 410, and approximately 0.44 inches from the right side 966 of the extension 932 to the right edge 914 of the panel 410. Intersections 968 of the outboard edge 962 with the left 964 and right side 966 of the extension 932 are beveled at approximately a 45 degree angle. A series of notches 970, 972 is machined in the bottom edge extension 932 to receive pin studs to connect the passenger's side panel 410 to the adjacent base plate 402.

Three rounded notches 970, 972 are machined into the bottom edge extension 930. A single notch 970 is machined into the center portion of the bottom edge extension 932, extending approximately 0.6 inches from the outboard edge 962 of the extension 932 towards the bottom side 906 of the passenger's side panel 410. The single notch 970 is rounded at the end to approximately a 0.15 inch radius. The other two notches 972 are machined into the extension 932 where the beveled sides 964, 966 intersect with the outboard edge 962 of the bottom edge extension 932.

A series of holes 974 is machined in the front side 904 of the passenger's side panel 410 to receive corresponding bolts (not shown) to connect the front panel 406, the back panel 412, and the back divider 416 to the passenger's side panel 410.

FIGS. 10a–c illustrate a back panel 412 as shown in FIG. 4b. FIG. 10a shows a front view of the back panel 412, FIG. 10b shows the right edge view of the back panel 412, and FIG. 10c shows the bottom edge view of the back panel 412. The back panel 412 vertically mounts to the right edge 610 of the driver's side panel 404 and to the left edge 912 of the passenger's side panel 410 to provide one side of the case 206. The back panel 412 is configured for providing user access to the interior of the case 206. The back panel 412 is a rectangular-shaped piece that includes a front side 1002 opposing a bottom side 1004, a top edge 1006 opposing a bottom edge 1008, a left edge 1010 opposing a right edge 1012, a center portal 1014, and a corner portal 1016.

The back panel 412 is manufactured from conventional 14 gauge steel approximately 0.075 inches thick measured from the front side 1002 to the bottom side 1004. The back panel 412 measures approximately 21.9 inches from the top edge 1006 to the bottom edge 1008, and approximately 18.0 inches from the left edge 1010 to the right edge 1012.

The center portal 1014 is positioned in the center portion of the back panel 412, and is configured for user access to the interior of the case 206. The center portal 1014 includes a top interior edge 1018 opposing a bottom interior edge 1020, and a left interior edge 1022 opposing a right interior edge 1024. The top interior edge 1018 of the center portal 1014 is spaced approximately 4.5 inches from the top edge 1006 of the back panel 412. The bottom interior edge 1020 of the center portal 1014 is spaced approximately 4.4 inches from the bottom edge 1008 of the back panel 412. The left interior edge 1022 is spaced approximately 6.0 inches from the left edge 1010 of the back panel 412. The right interior edge 1024 is spaced approximately 6.0 inches from the right edge 1012 of the back panel 412. Thus, the center portal 1014 measures approximately 13.0 inches from the top interior edge 1018 to the bottom interior edge 1020, and approximately 6.0 inches from the left interior edge 1022 to the right interior edge 1024.

The corner portal 1016 is positioned in the lower left portion of the back panel 412, and is configured to permit electrical or other functional wiring to pass through the back panel 412 to connect electrical equipment inside the case 206, such as a laptop or portable computer, a power unit, a printer, or other computer peripheral devices to an external power supply or other functional device. The corner portal 1016 includes a lower top interior edge 1026 opposing a lower bottom interior edge 1028, and a lower left interior edge 1030 opposing a lower right interior edge 1032. The lower top interior edge 1026 is spaced approximately 18.9 inches from the top edge 1006 of the back panel 412. The lower bottom interior edge 1028 of the corner portal 1016 is spaced approximately 1.5 inches from the bottom edge 1008 of the back panel 412. The lower left interior edge 1030 of the corner portal 1016 is spaced approximately 1.5 inches from the left edge 1010 of the back panel 412. The lower right interior edge 1032 is spaced approximately 12.0 inches from the right edge 1012 of the back panel 412. Thus, the corner portal 1016 measures approximately 1.5 inches from the lower top interior edge 1026 to the lower bottom interior edge 1028, and approximately 3.0 inches from the lower left interior edge 1030 to the lower right interior edge 1032.

The bottom edge 1008 has a lip 1034 similarly shaped to the bottom edge extension 932 in FIG. 9e that extends substantially perpendicular from the bottom side 1004 of the back panel 412. The lip 1034 includes an outboard edge 1036, and a left side 1038 opposing a right side 1040. The lip 1034 extends approximately 1.0 inches between the outboard edge 1036 to the bottom side 1004 of the back panel 412. The lip 1034 measures approximately 17.0 inches between the left side 1038 and the right side 1040 of the lip 1034. The left side 1038 of the lip 1034 is spaced approximately 0.44 inches from the left edge 1010 of the back panel 412, and the right side 1040 of the lip 1034 is spaced approximately 0.44 inches from the right edge 1012 of the back panel 412. The sides 1038, 1040 of the lip 1034 are beveled at approximately a 45 degree angle.

Four rounded notches 1042, 1044 are machined into the lip 1034 at the bottom edge 1008 of the back panel 412. Two notches 1042 are machined into the center portion of the lip, extending approximately 0.55 inches from the outboard edge 1036 of the lip 1034 towards the front side 1002 of the back panel 412. These notches 1042 are rounded at the end to approximately a 0.13 inch radius. Similar sized notches 1044 are machined into the side portions of the lip 1034 at the intersection of the bevel and the outboard edge 1036 of the lip 1034.

A series of six holes 1046 is machined into the back panel 412 around the center portal 1014. The holes are sized to receive corresponding bolts to secure a side access panel 414 over the center portal 1014. A series of holes 1048 is machined near the left and right portions of the back panel 412 to receive corresponding bolts to connect the driver's side panel 404 and the passenger's side panel 410 to the back panel 412. A series of holes 1050 is machined along the top edge 1006 of the back panel 412 to receive corresponding bolts to connect the top of the tracks for the lid 420 to the back panel 412. A pair of holes 1052 is machined below the corner portal 1016 to receive corresponding bolts to connect the bottom of the tracks (not shown) for the lid 420 to the back panel 412.

FIGS. 11a–c illustrate a side access panel 414 as shown in FIG. 4b. FIG. 11a shows a front view of the side access panel 414, FIG. 11b shows the right edge view of the side access panel 414, and FIG. 11c shows a bottom edge view of the side access panel 414. The side access panel 414 is configured to cover the center portal 1014 machined in the back panel 412. The side access panel 414 is a rectangular-shaped piece made from conventional 14 gauge steel. The side access panel 414 includes a front side 1102 opposing a bottom side 1104, a top edge 1106 opposing a bottom edge 1108, and a left edge 1110 opposing a right edge 1112. The side access panel 414 measures approximately 0.075 inches thick measured from the top side 1102 to the bottom side 1104, approximately 15.4 inches from the top edge 1106 to the bottom edge 1108, and approximately 8.4 inches measured from the left edge 1110 to the right edge 1112. Each corner 1114 of the side access panel 414 is rounded to a radius of approximately 1.7 inches. A series of six mounting holes 1116 is machined around the edges 1102–1112 of the side access panel 414. The mounting holes 1116 are sized to receive mounting bolts (not shown) to connect the side access panel 414 over the center portal 1014 of the back panel 412. Each of the mounting holes 1116 is machined to approximately 0.2 inches in diameter.

FIGS. 12a–d illustrate a passenger's side divider 416 as shown in FIG. 4. FIG. 12a shows a front view of the passenger's side divider 416, FIG. 12b shows a left edge view of the passenger's side divider 416, FIG. 12c shows a top view of the passenger's side divider 416, and FIG. 12d shows a right edge view of the passenger's side divider 416. A passenger's side divider 416 is configured for vertically dividing the interior space of the case between the front panel 406 and the back panel 412. The passenger's side divider 416 is a rectangular-shaped piece that includes a front side 1202 opposing a bottom side 1204, a top edge 1206 opposing a bottom edge 1208, a left edge 1210 opposing a right edge 1212, and a center portal 1214.

The passenger's side divider 416 is manufactured from conventional 14 gauge steel approximately 0.075 inches thick measured from the front side 1202 to the bottom side 1204. The divider 416 measures approximately 20.3 inches from the top edge 1206 to the bottom edge 1208, and approximately 13.0 inches from the left edge 1210 to the right edge 1212.

The center portal 1214 is a window machined into the upper left portion of the passenger's side divider 416. The center portal 1214 is configured to provide clearance for the platform 422 to rotate within the case 206. The center portal 1214 includes a top interior edge 1216 opposing a bottom interior edge 1218, and a left interior edge 1220 opposing a right interior edge 1222. The center portal 1214 measures approximately 3.0 inches between the top interior edge 1216 and the bottom interior edge 1218, where the top interior edge 1216 is spaced approximately 4.3 inches from the top edge 1206 of the divider 416, and the bottom interior edge 1218 is spaced approximately 13.0 inches from the bottom edge 1208 of the divider 416. Furthermore, the center portal 1214 measures approximately 7.9 inches between the left interior edge 1220 and the right interior edge 1222, where the left interior edge 1220 is spaced approximately 4.5 inches from the left edge 1210 of the divider 416, and the right interior edge 1222 is spaced approximately 0.60 inches from the right edge 1212 of the divider 416.

Two holes 1224 are machined in the upper central portion of the divider 416 above the center portal 1214. These two holes 1224 are configured to receive bolts (not shown) that connect the divider 416 to the side access plate 414. A series of three holes 1226 is machined in the center portion of the divider 416, and are positioned across the width the divider 416 between the left edge 1210 and the right edge 1212. These three holes 1226 are configured to receive bolts (not shown) that connect the divider 416 to the computer tray 424. A series of twelve holes 1228 is machined in the lower portion of the divider 416, and is positioned in a three vertical hole by four horizontal hole configuration. These twelve bolt holes 1228 are configured to receive bolts (not shown) that connect the divider 416 to the computer shelf 424, the printer shelf 426, and the drawer 428. Two holes 1230 are machined in the lower left portion along the left edge 1210 of the divider 416 to receive bolts (not shown) that connect the divider 416 to the front panel 406.

The left edge 1210 and right edges 1212 have upper extensions 1232, 1234 that extend substantially perpendicular from the bottom side 1204 of the divider 416.

These upper extensions 1232, 1234 are configured to correspond with the front panel 406 and the back panel 412 so the divider 416 can be connected between these panels 406, 412. The upper left edge extension 1232 includes an outboard edge 1236, and a top side 1238 opposing a bottom side 1240. The upper left edge extension 1232 extends approximately 0.70 inches from the front side 1202 of the divider 416 to the outboard edge 1236 of the upper left edge extension 1232. The upper left edge extension 1232 measures approximately 16.9 inches between the top side 1238 and the bottom side 1240 of the upper extension 1232, and is spaced approximately 0.26 inches from the top edge 1206 of the divider 416, and approximately 3.1 inches from the bottom edge 1208 of the divider 416. A series of three holes 1242 is machined into the upper left edge extension 1232. These holes 1242 are sized to receive bolts (not shown) that connect the divider 416 to the back panel 412.

A similarly-shaped upper right edge extension 1234 extends substantially perpendicular to the bottom side 1240 of the divider 416. The upper right edge extension 1234 includes an outboard edge 1243, and a top side 1244 opposing a bottom side 1246. The upper right edge extension 1234 extends approximately 0.70 inches from the front side 1202 of the divider 416 to the outboard edge 1243 of the upper right edge extension 1234. The upper right edge extension 1234 measures approximately 19.6 inches between the top side 1244 and the bottom side 1240, and is spaced approximately 0.26 inches from the top edge 1206 of the divider 416, and approximately 0.4 inches from the bottom edge 1208 of the divider 416. A series of three holes 1248 is machined into the upper right edge extension 1234. These holes 1248 are sized to receive bolts (not shown) that connect the divider 416 to the front panel 406.

A lower left edge extension 1250 extends in an opposing direction to the upper left edge extension 1232. The lower left edge extension 1250 is a piece configured to connect the divider 416 to the back panel 412. The lower left edge extension 1250 includes an outboard side 1252, and an upper side 1254 opposing a lower side 1256. The lower left edge extension 1232 extends approximately 1.0 inches measured from the outboard side 1252 to the front side 1202 of the divider 416. The lower left edge extension 1250 measures approximately 2.5 inches in length between the upper side 1254 and lower side 1256 of the lower left edge extension 1250, and is spaced approximately 0.24 inches from the bottom edge 1208 of the divider 416. A single hole 1257 is machined into the lower left edge extension 1250. This holes 1257 is sized to receive a bolt (not shown) that connects the divider 416 to the back panel 412.

A lower right edge extension 1258 extends in an opposing direction to the upper right edge extension 1234. The lower right edge extension 1258 is a piece configured to connect the divider 416 to the back panel 412. The lower right edge extension 1258 includes an outboard side 1260, and an upper side 1262 opposing a lower side 1264. The lower right edge extension 1258 extends approximately 1.0 inches measured from the outboard side 1260 to the front side 1202 of the divider 416. The lower right edge extension 1258 measures approximately 2.5 inches in length between the upper side 1262 and lower side 1264 of the lower right edge extension 1258, and is spaced approximately 0.24 inches from the bottom edge 1208 of the divider 416. A single hole 1266 is machined into the lower right edge extension 1258. This hole 1266 is sized to receive a bolt that connects the divider 416 to the back panel 412.

FIGS. 13a–c illustrate a back divider 418 as shown in FIG. 4b. FIG. 13a shows a front view of the back divider 418, FIG. 13b shows a top view of the back divider 418, and FIG. 13c shows a right edge view of the back divider 418. A back divider 418 is configured for vertically dividing the interior space of the case 206 from the driver's side panel 404 to the passenger's side panel 410. The back divider 418 includes a front side 1302 opposing a bottom side 1304, a top edge 1306 opposing a bottom edge 1308, a left edge 1310 opposing a right edge 1312, a top left interior edge 1314 opposing a top right interior edge 1316, a center interior edge 1318, a lower left interior edge 1320 adjacent to a lower left bottom interior edge 1322, a lower right top edge 1324 opposing a lower right bottom edge 1326, and a lower right interior edge 1328. The back divider 418 is manufactured from conventional 14 gauge steel approximately 0.075 thick measured between the front side 1302 and the bottom side 1304 of the divider 418. The back divider 418 is approximately 20.3 inches tall measured from the top edge 1306 to the bottom edge 1308, and approximately 17.8 inches wide measured from the left edge 1310 to the right edge 1312.

The back divider 418 has a relatively large vertical cutout 1330 machined in the top center portion of the divider 418. The large cutout 1330 is configured for spacing clearance so that the platform 422 can rotate within the case 206. The top left interior edge 1314 and the top right interior edge 1316 form the vertical sides of the large cutout 1330. The center interior edge 1318 forms a horizontal bottom side of the cutout 1330. The top left interior edge 1314 measures approximately 7.4 inches from the top edge 1306 of the back divider 418, and is spaced approximately 6.8 inches from the left edge 1310 of the back divider 418. The top right interior edge 1316 measures approximately 7.2 inches from the top edge 1306 of the back divider 418, and is spaced approximately 5.3 inches from the right edge 1312. The center interior edge 1318 measures approximately 5.7 inches across between the top left interior edge 1314 and the top right interior edge 1316.

Two interior corners 1332 are formed by the intersection of the top left interior edge 1314 and the top right interior edge 1316 with the center interior edge 1318. These interior corners 1332 are rounded to an approximate radius of 0.2 inches.

A lower corner cutout 1334 is machined into the lower left portion of the back divider 418. The corner cutout 1334 is configured for receiving cables for power, computer peripheral devices, and other devices or associated equipment. The lower left bottom interior edge 1322 forms the horizontal top side of the cutout 1334, and the lower left interior edge 1324 forms the vertical side of the cutout 1334. The lower left bottom interior edge 1322 measures approximately 5.0 inches from the left edge 1310, and is spaced approximately 5.8 inches from the bottom edge 1308 of the back divider 418. The lower left bottom interior edge 1324 measures approximately 5.8 inches from the bottom edge 1308, and is spaced approximately 5.0 inches from the left edge 1310 of the back divider 418. A corner 1336 is formed between the lower left bottom interior edge 1322, and the lower left interior edge 1324 and is rounded to approximately a 0.5 inch radius.

A relatively small cutout 1338 is machined into the lower right corner portion of the back divider 418. The lower right top edge 1324 forms the top horizontal side of the cutout 1338, and the lower right bottom edge 1326 forms an opposing side of the cutout 1338. The lower right interior edge 1328 connects between the lower right top edge 1324 and the lower right bottom edge 1326 to form a vertical side of the cutout 1338. The lower right top edge 1324 measures approximately 3.0 inches from the right edge 1312 of the back divider 418, and is spaced apart from the lower right bottom edge 1326 by approximately 2.0 inches. The lower right bottom edge 1326 measures approximately 3.0 inches, and is spaced apart from the bottom edge 1308 of the divider 418 by approximately 3.8 inches. The lower right interior edge 1328 measures approximately 2.0 inches and is spaced apart from the right edge 1312 by approximately 3.0 inches. Corners 1339 formed between the lower right interior edge 1328 and the lower right top edge 1324 and the lower right bottom edge 1326 are rounded to approximately a 0.5 inch radius.

Two relatively small cutouts 1340, 1342 are machined into the upper left edge 1310 and into the upper right edge 1312 of the back divider 418. The small cutout 1340 on the left edge 1310 includes an inboard edge 1344, and a top side 1346 opposing a bottom side 1348. The cutout 1340 is approximately 0.7 inches deep measured from the left edge 1310 to the inboard edge 1344, and measures approximately 1.6 inches wide from the top side 1346 to the bottom side 1348 of the cutout 1340. The top side 1346 of the left edge cutout 1340 is spaced approximately 1.0 inches from the top edge 1306 of the back divider 418.

Similarly sized and positioned, the upper right edge cutout 1342 includes an inboard edge 1350, and a top side 1352 opposing a bottom side 1354. The right edge cutout 1342 is approximately 0.7 inches deep measured from the right edge 1312 to the inboard edge 1350, and measures approximately 1.6 inches wide from the top side 1352 to the bottom side 1354. The top side 1352 of the right edge cutout 1342 is spaced approximately 1.0 inches from the top edge 1306 of the back divider 418.

A relatively thin cutout 1356 is machined into the back divider 418 along the top edge 1306 of the divider 418. The thin cutout 1356 includes an inboard edge 1358, and a left side 1360 opposing a right side 1362. The thin cutout 1356 measures approximately 0.2 inches from the top edge 1306 of the divider 418 to the inboard edge 1358 of the cutout 1356, and approximately 4.4 inches from the left side 1360 to the right side 1362 of the cutout 1356. The right side 1362 of the thin cutout 1356 is spaced approximately 0.40 inches from the right edge 1312 of the back divider 418, and the left side 1360 of the thin cutout 1356 is spaced approximately 0.58 inches from the top right interior edge 1316 of the large vertical cutout 1330.

The left edge 1310 and right edge 1312 have center extensions 1364, 1366 that extend substantially perpendicular to the front side 1302 of the back divider 418. These extensions 1364, 1366 are configured to correspond with the driver's side panel 404 and the passenger's side divider 416 to connect the back divider 418 to these components 404, 416. The left edge extension 1364 includes an outboard edge 1368, and a top side 1370 opposing a bottom side 1372. The left edge extension 1364 extends approximately 0.70 inches from the front side 1302 of the back divider 418 to the outboard edge 1368 of the left edge extension 1364. The left edge extension 1364 measures approximately 11.5 inches between the top side 1370 and the bottom side 1372, and is spaced approximately 2.6 inches from the top edge 1306 of the back divider 418, and approximately 6.2 inches from the bottom edge 1308 of the back divider 418. A series of holes 1374 is machined in the left edge extension 1364 to receive corresponding bolts (not shown) to connect the back divider 418 to driver's side panel 404.

Similarly shaped and positioned, the right edge extension 1366 includes an outboard edge 1376, and a top side 1378 opposing a bottom side 1380. The right edge extension 1366 extends approximately 0.70 inches from the front side 1302 of the back divider 418 to the outboard edge 1376 of the right edge extension 1366. The right edge extension 1366 measures approximately 11.5 inches between the top side 1378 and the bottom side 1380, and is spaced approximately 2.6 inches from the top edge 1306 of the back divider 418, and approximately 6.2 inches from the bottom edge 1308 of the back divider 418. A series of holes 1382 is machined in the left edge extension 1364 to receive corresponding bolts (not shown) to connect the back divider 418 to driver's side panel 404.

The left edge 1310 and right edge 1312 have upper extensions 1384, 1386 that extend substantially perpendicular from the front side 1302 of the back divider 418. These extensions 1384, 1386 are configured to correspond with the driver's side panel 404 and the passenger's side divider 416 to connect the back divider 418 to these components 404, 416. The left edge upper extension 1384 includes an outboard edge 1388, and a top side 1390 opposing a bottom side 1392. The left edge upper extension 1384 extends approximately 0.70 inches from the front side 1302 of the back divider 418 to the outboard edge 1388 of the left edge upper extension 1384. The left edge upper extension 1384 measures approximately 0.76 inches between the top side 1378 and the bottom side 1380, and is spaced approximately 0.26 inches from the top edge 1306 of the back divider 418, and approximately 1.6 inches from the top side 1370 of the left edge extension 1364. A single hole 1394 is machined in the left edge upper extension 1384 to receive a corresponding bolt (not shown) to connect the back divider 418 to the back panel 412. The hole 1394 is approximately 0.2 inches in diameter.

Similarly shaped and positioned, the right edge upper extension 1386 includes an outboard edge 1395, and a top side 1396 opposing a bottom side 1397. The right edge upper extension 1386 extends approximately 0.70 inches from the front side 1302 of the back divider 418 to the outboard edge 1395 of the right edge upper extension 1386. The right edge upper extension 1386 measures approximately 0.76 inches between the top side 1396 and the bottom side 1397, and is spaced approximately 0.26 inches from the top edge of the back divider 418, and approximately 1.6 inches from the top side 1396 of the right edge center extension 1366. A single hole 1398 is machined in the right edge upper extension 1386 to receive a corresponding bolt (not shown) to connect the back divider 418 to the passenger's side divider 416. The hole 1398 is approximately 0.2 inches in diameter.

A series of eleven holes 1399 is machined into the back divider 418 to receive corresponding bolts (not shown) to connect the back divider 418 to the computer tray 424, the printer shelf 426, and the drawer 428.

Figure 14:
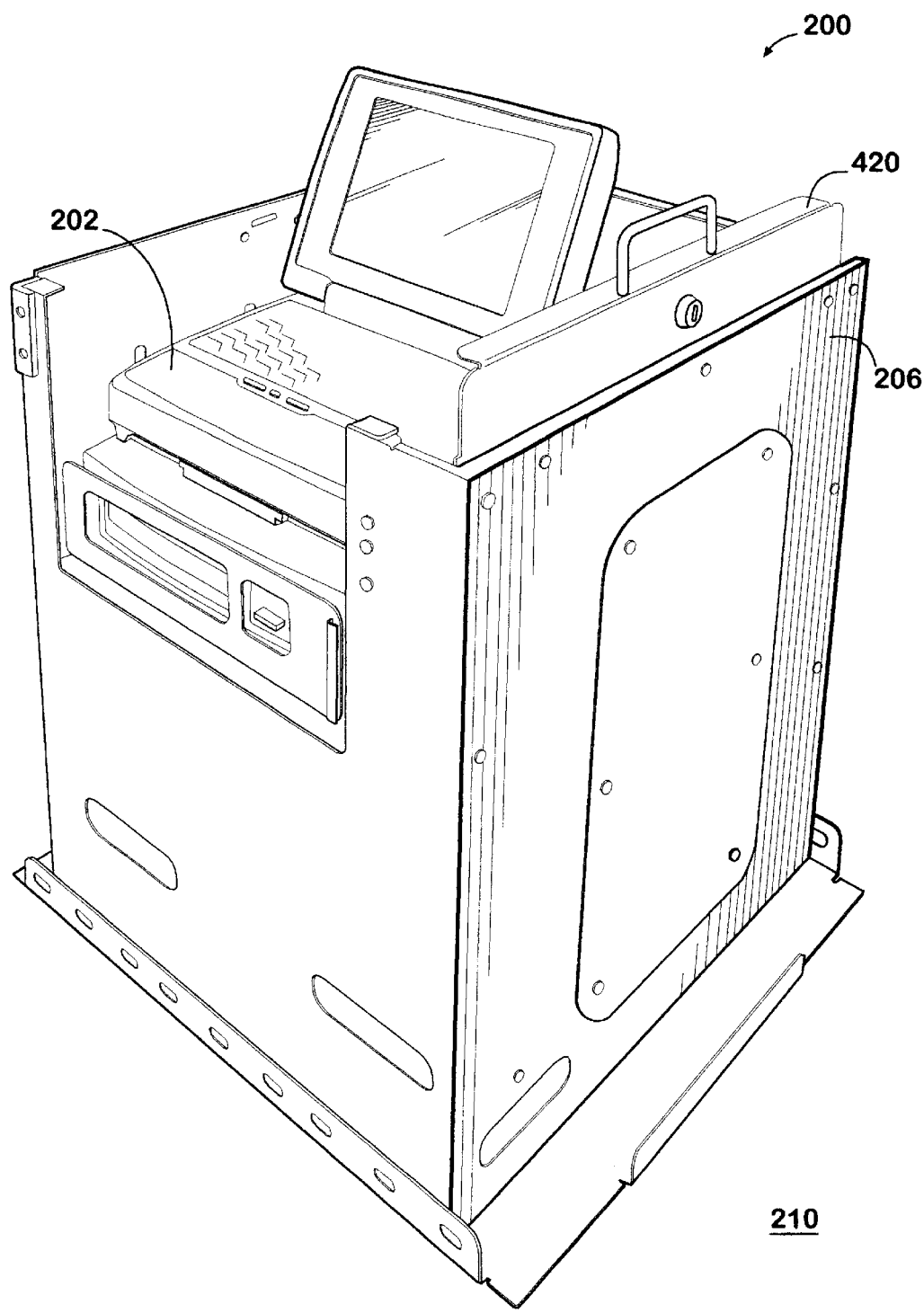
FIG. 14 is a perspective view of a storage system as shown in FIG. 2 with the lid in an open position.

While FIG. 2 illustrates a perspective view of a storage system 200 for a portable computer with a lid 420 or large door in a closed position, FIG. 14 illustrates a perspective view of the storage system 200 for a portable computer shown in FIG. 2 with a lid 420 or large door in an open position. As described preciously, the lid 420 is hinged to the case 206 to permit the lid 420 to be moved away from the top portion the case 206 to permit user access to a portable computer 202.

FIGS. 15a–c illustrate a lid 420 or large door as shown in FIG. 4b. FIG. 15a shows a front side of the lid 420, FIG. 15b shows a top view of the lid 420, and FIG. 15c shows a right edge view of the lid 420. The lid 420 is a rectangular-shaped piece manufactured from conventional 14 gauge steel. The lid 420 is configured to cover the top portion of the case 206 so that a laptop or portable computer 202 can be secured within the case 206, while providing a horizontal surface to perform other work tasks.

When the lid 420 is in a closed position as shown in FIG. 2, the laptop or portable computer 202 inside the case 206 is stowed away within the case 206 and the lid 420 serves as a horizontal platform for other work tasks. Alternatively, when the lid 420 is in an open position as shown in FIG. 14, the lid 420 is stowed away between the back divider 418 and the back panel 412 so that the computer 202 can be utilized for work tasks.

Referring back to FIGS. 15a–c, the lid 420 includes a top side 1502 opposing a bottom side 1504, a top edge 1506 opposing a bottom edge 1508, a left edge 1510 opposing a right edge 1512. The lid 420 measures approximately 0.075 inches thick from the top side 1502 to the bottom side 1504, 17.1 inches high from the top edge 1506 to bottom edge 1508, approximately 16.0 inches wide from the left edge 1510 to right edge 1512. The corners 1514 of the lid 420 are rounded to approximately a 0.5 inch radius. A series of four holes 1516 located in the corner portions of the lid 420 is machined to receive rollers (not shown) to assist the movement of the lid 420 along the edges of the casing 206.

A lock hole 1518 in the left side portion of the lid 420 is sized to receive a lock mechanism to secure the lid 420 to the case 206. The lock hole 1518 includes a left interior edge 1520 opposing a right interior edge 1522, and a top interior edge 1524 opposing a bottom interior edge 1526. The lock hole 1518 measures approximately 0.75 inches wide from the left interior edge 1520 to the right interior edge 1522, and approximately 0.64 inches high from the top interior edge 1524 to the bottom interior edge 1526. The left 1520 and right interior edges 1522 of the lock hole 1518 are rounded to approximately a 0.38 inch radius.

A slight indentation 1528 in the right side portion of the top edge 1506 and in the right side portion of the bottom edge 1508 create a clearance space for a hinge means 1530 to be connected to the lid 420. The indentations 1528 measure approximately 1.174 inches wide measured from the right edge 1512 of the lid 420, and approximately 0.23 inches deep measured from the top edge 1506 and the bottom edge 1508 respectively.

Relatively smaller indentations 1532 in the upper portion of the right edge 1512 and the lower portion of the right edge 1512 create further clearance space for a hinge means 1530 to be connected to the lid 420. The smaller indentations 1532 measure approximately 0.10 inches wide from the right edge 1512, and approximately 1.27 inches long from the top edge 1506 and bottom edge 1508 respectively.

A hinge means 1530, such as a hinge tab and hinge guide combination, connects the lid 420 to the case 206. Hinge tabs 1534 extend from the slight indentations 1528 in the right side portion of the top edge 1506 and from the right side portion of the bottom edge 1508. The hinge tabs 1534 are rectangular-shaped pieces with a rounded outboard edge 1536, a front side 1538 opposing a bottom side 1540, and a left side edge 1542 opposing a right side edge 1544. The hinge tabs 1534 extend substantially perpendicular from the bottom side 1504 of the lid 420. Each tab 1534 measures approximately 1.1 inches wide from the left side edge 1542 to the right side edge 1544, and approximately 1.3 inches high from the outboard edge 1536 to the top side 1502 of the lid 420. The outboard edge 1536 is rounded to approximately a 0.55 inch radius. A steel stud 1546 connects to the bottom side 1540 of each hinge tab 1534. The steel studs 1546 are sized to extend into corresponding holes in a hinge guide (see FIG. 16) of the hinge means 1530. The steel stud 1546 measures approximately 0.28 inches in diameter, and is approximately 0.38 inches in length. Other hinge means can include a conventional hinge assembly or other similar type device for connecting a lid to a case.

The left edge has an extension 1548 is approximately 15.7 inches long, and is approximately 0.9 inches high measured from the left edge 1510 of the lid 420. The left edge extension 1548 is spaced approximately 0.7 inches from the top edge 1506 and the bottom edge 1508 of the lid 420. Corners 1550 of the left edge extension 1548 are rounded to approximately a 0.5 inch radius. A series of holes 1552 machined in the left edge extension 1548 are sized to receive bolts (not shown) that connect the left edge extension 1548 to associated wiring boxes (not shown) or harnesses.

Figure 16A:
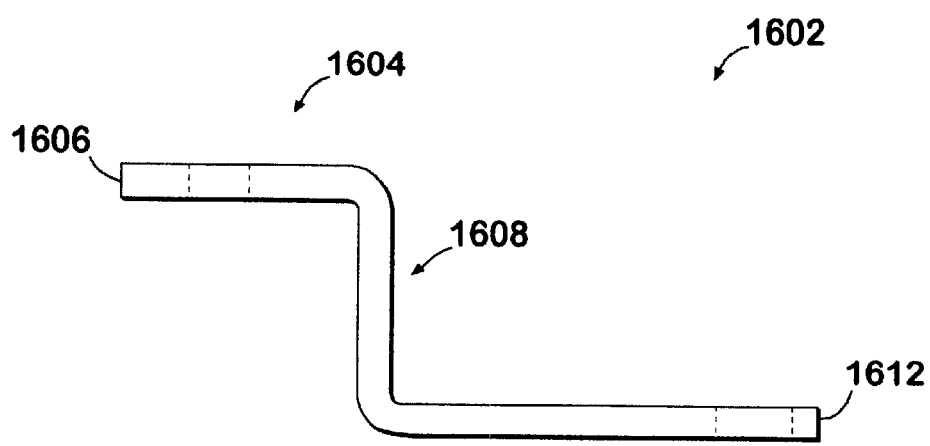
FIG. 16a illustrates side view of a hinge guide for a storage system shown in FIG. 2.
Figure 16B:
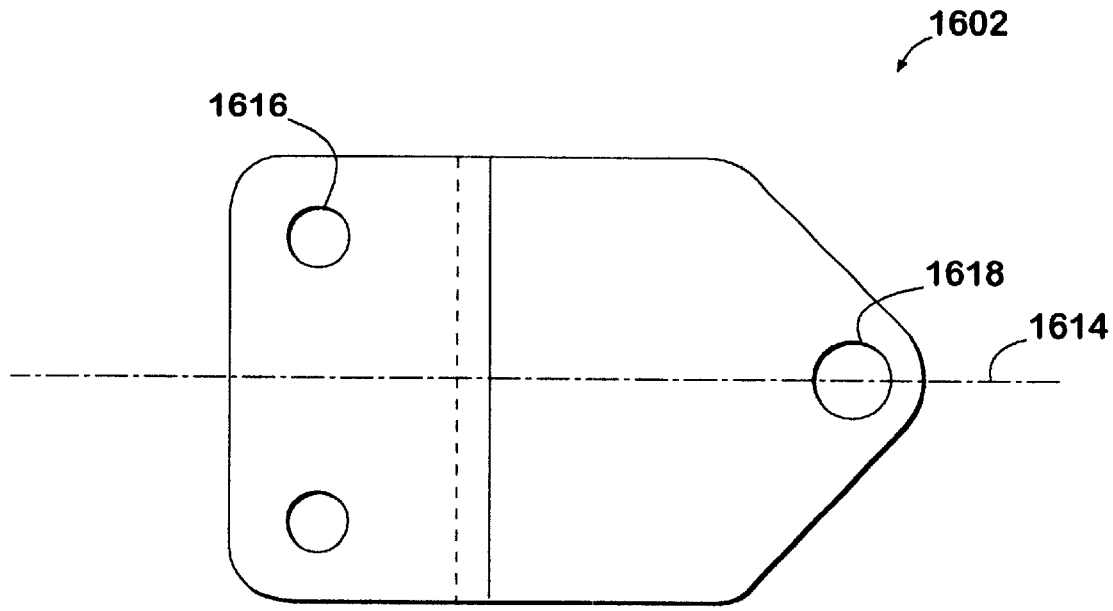
FIG. 16b illustrate a top view of a hinge guide for a storage system shown in FIG. 2.

FIGS. 16*a–b* illustrate a hinge guide 1602. FIG. 16*a* shows a side view of the hinge guide 1602, and FIG. 16*b* shows a front view of the hinge guide 1602. A hinge guide 1602 connects to the driver's side panel 404 and another hinge guide 1602 connects to the passenger's side panel 410. The hinge guides 1602 are configured to receive the steel studs 1546 of the hinge tabs 1534 so the hinge tabs 1534 can hingeably rotate with respect to the hinge guide 1602. The hinge guide 1602 includes a panel arm 1604 with an outboard edge 1606, a connecting arm 1608, a tab arm 1610 with an outboard edge 1612. When the hinge guide 1602 is configured along a horizontal axis 1614, the connecting arm 1608 connects the panel arm 1604 to the tab arm 1610, where the connecting arm 1608 is positioned substantially perpendicular to both the panel arm 1604 and the tab arm 1610, and where the panel arm 1604 and tab arm 1610 are substantially parallel with one another. The panel arm 1604 and the connecting arm 1608 are rectangular-shaped pieces manufactured from conventional 11 gauge steel approximately 0.125 inches thick. Corners of the outboard edge 1606 of the panel arm 1604 are rounded to approximately a 0.2 inch radius. The tab arm 1610 is a rectangular-shaped piece with the outboard edge 1612 rounded to approximately a 0.26 inch radius.

The length of the hinge guide 1602 measures approximately 2.5 inches in length between the outboard edge 1606 of the panel arm 1604 and the outboard edge 1612 of the tab arm 1610. The panel arm 1604 is approximately 0.94 inches in length measured from the outboard edge 1606 of the panel arm 1604 to the connecting arm 1608, and the tab arm 1610 measures approximately 1.63 inches measured from the outboard edge 1612 of the tab arm 1610 to the connecting arm 1608. Two holes 1616 are machined in the panel arm 1604 to connect the hinge guide 1602 to the driver's side panel 404 and to the passenger's side panel 410. The two holes 1616 are approximately 0.2 inches in diameter, and are spaced approximately 0.31 inches from the outboard edge 1606 of the panel arm 1604. A single hole 1618 machined in the tab arm 1610 is sized to receive the steel stud 1546 of the hinge tab 1534. The single hole 1618 is approximately 0.28 inches in diameter, and is positioned approximately 1.88 inches from the two holes 1616 in the panel arm 1604, measured along the horizontal axis 1614 of the hinge guide 1602.

When the lid 420 is lifted to a substantially vertical position, the lid 420 can be retracted within the casing 206. A series of tracks (not shown) mount to the bottom side 1004 of the back panel 412 to guide the lid 420 into a stowed position within the casing 206. The hinge means 1530, hinge guide 1602, and tracks (not shown) cooperate to permit the lid 420 to be stowed within the casing 206.

FIGS. 17–20 illustrate interior shelves or trays, such as a platform 422, a computer shelf 424, a printer shelf 426, and a drawer 428, that sub-divide the interior space of the case 206 as shown in FIG. 4*b*. The interior shelves or trays provide user access to one or more interior compartments inside the case 206 for storing computer peripheral devices, office supplies, and other items. FIGS. 17*a–c* illustrate a platform 422 or CPU tray as shown in FIG. 4*b*. FIG. 17*a* shows a top view of the platform 422, FIG. 17*b* shows a front view of the platform 422, and FIG. 17*c* shows a right edge view of the platform 422. A platform 422 includes a rectangular-shaped base 1702 connected to a rectangular-shaped front access wall 1704. The platform 422 is manufactured from conventional 11 gauge steel approximately 0.13 inches thick. The platform 422 is configured to horizontally support a docking station (not shown) or power unit for a laptop or portable computer 202. The base 1702 includes a top side 1706 opposing a bottom side 1708, a front edge 1710 opposing a rear edge 1712, and a left edge 1714 opposing a right edge 1716. The base 1702 measures approximately 10.5 inches deep from the front edge 1710 to the rear edge 1712, and approximately 10.6 inches wide from the left edge 1714 to the right edge 1716. Corners 1718 of the right edge 1716 are rounded to approximately a 0.40 inch radius. A series of nine holes 1720 is machined into the base 1702 to receive bolts to connect the base 1702 to a swivel mechanism (not shown) and to connect the base 1702 to a docking station (not shown) or power supply for a laptop or portable computer 202.

The front access wall 1704 includes a front side 1722 opposing a bottom side 1724, a top edge 1726 opposing a bottom edge 1728, and a left edge 1730 opposing a right edge 1732. The bottom edge 1728 of the front access wall 1704 connects to the front edge 1710 of the base 1702 so that the front access wall 1704 is substantially perpendicular to the base 1702. The front access wall 1704 measures approximately 2.2 inches high from the top edge 1726 to the bottom edge 1728 of the access wall 1704, and approximately 10.6 inches wide from the left edge 1730 to the right edge 1732 of the access wall 1704. Top corners 1734 of the front access wall 1704 are rounded to approximately a 0.40 inch radius. A hole 1736 is machined into the top corner portions of the front access wall 1704. The holes 1736 are sized to receive bolts to connect the front access wall 1704 to a docking station (not shown) or power supply for a laptop or portable computer 202.

The front access wall 1704 has two portals 1738, 1740 cut through the wall 1704 to permit user access to a docking station (not shown) supported by the platform 422. A relatively larger portal 1738 includes a top interior edge 1742 opposing a bottom interior edge 1744, and a left interior edge 1746 opposing a right interior edge 1748. A relatively smaller portal 1740 includes a top interior edge 1750 opposing a bottom interior edge 1752, and a left interior edge 1754 opposing a right interior edge 1756. The top edge 1742, 1750 of each portal 1738, 1740 is positioned approximately 0.60 inches from the top edge 1726 of the access wall 1704. The left interior edge 1746 of the relatively larger portal 1738 is spaced approximately 0.98 inches from the left edge 1730 of the access wall 1704, and the right interior edge 1756 of the relatively smaller portal 1740 is spaced approximately 1.6 inches from the right edge 1732 of the access wall 1704. The smaller portal 1740 measures approximately 1.8 inches wide from the left interior edge 1754 to the right interior edge 1756, and is approximately 1.6 inches high measured from the top interior edge 1750 to the bottom interior edge 1752. The larger portal 1738 measures approximately 5.9 inches wide from the left interior edge 1754 to the right interior edge 1756, and approximately 1.6 inches high measured from the top interior edge 1750 to the bottom interior edge 1752. The right interior edge 1756 of the larger portal 1738 is spaced approximately 0.4 inches apart from left interior edge 1754 of the smaller portal 1740.

A suitable platform 206 is an Itronix-type cradle manufactured by Itronics Corporation of Spokane, Wash. Other similar types of platforms can be used for mounting the laptop or personal computer, including but not limited to, Panasonic, or customized fit platforms. Typically, a docking station provides a conventional RF connection for a high gain antenna, connecting pins for a computer, electrical connections to an exterior power supply, and input/output connections for computer peripheral devices. Furthermore, the docking station can connect to a fuse box associated with a power supply. The swivel (not shown) connects the platform 422 or CPU tray to the computer shelf 424. The swivel is configured to permit the platform 422 to rotate through a range of positions relative to the case 206. The swivel provides a user the ability to change the position of a computer 202 within the case 206. For example, excessive glare or reflection from a monitor screen attached to a computer 202 can be reduced by rotating the platform 422 using the swivel, thus changing the position of the computer 202.

Figure 18C:
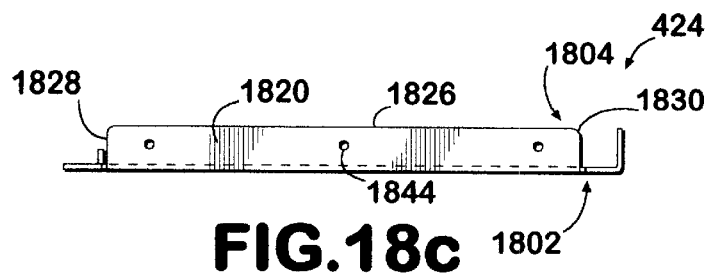
FIG. 18c illustrates a left edge view of a computer tray for a storage system shown in FIG. 2.
Figure 18A:
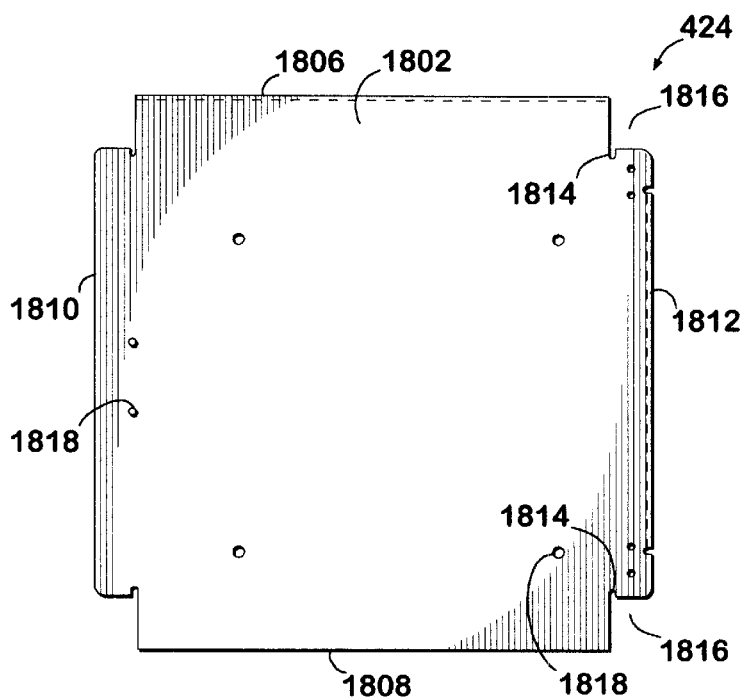
FIG. 18a illustrates a top view of a computer tray for a storage system shown in FIG. 2.
Figure 18D:
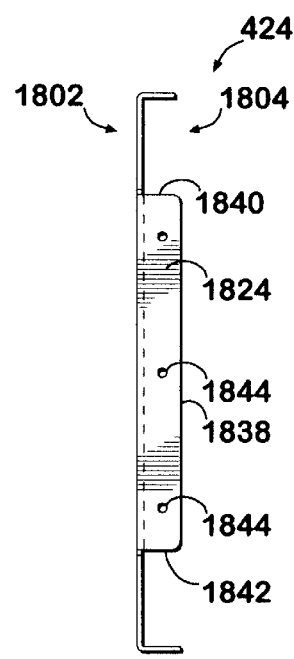
FIG. 18d illustrates a rear edge view of a computer tray for a storage system shown in FIG. 2.
Figure 18B:
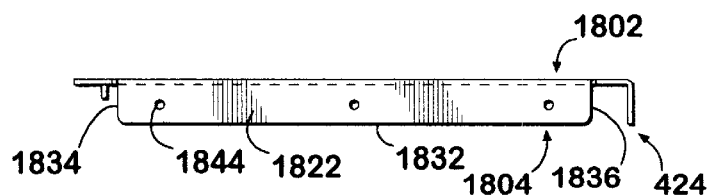
FIG. 18b illustrates a right edge view of a computer tray for a storage system shown in FIG. 2.

FIGS. 18a–d illustrate a computer shelf 424 shown in FIG. 4b. FIG. 18a shows a top view of the computer shelf 424, FIG. 18b shows a front view of the computer shelf 424, FIG. 18c shows a back edge view of the computer shelf 424, and FIG. 18d shows a right edge view of the computer shelf 424. The computer shelf 424 is configured to receive a swivel (not shown) or other similar device to rotate the platform 422 with respect to the computer shelf 424. The computer shelf 424 is a rectangular-shaped piece manufactured from conventional 11 gauge steel. The computer shelf 424 includes a top side 1802 opposing a bottom side 1804, a top edge 1806 opposing a bottom edge 1808, and a left edge 1810 opposing a right edge 1812. The computer shelf 424 measures approximately 0.13 inches thick from the top side 1802 to the bottom side 1804, approximately 12.8 inches deep from the top edge 1806 to the bottom edge 1808, and approximately 13.0 inches wide from the left edge 1810 to the right edge 1812. Corners 1814 of the computer shelf 424 have notches 1816 that measure approximately 1.0 inch from the left 1810 and right edges 1812, and approximately 1.2 inches from the top 1806 and bottom edges 1808 respectively. A series of holes 1818 in the computer shelf 424 are sized to receive bolts (not shown) used to mount a swivel (not shown) or other similar type device to rotate the platform 422 with respect to the computer shelf 424.

The top edge 1806, bottom edge 1808, and right edge 1812 have center extensions 1820, 1822, 1824 that extend substantially perpendicular from the bottom side 1804 of the computer shelf 424. These extensions 1820, 1822, 1824 are configured to correspond with shelf mounts (not shown) connected to the passenger's side divider 418 and the driver's side panel 404, so the computer shelf 424 can be supported in a substantially horizontal position relative to these vertically oriented pieces 418, 404. The top edge center extension 1820 includes an outboard edge 1826, and a left side 1828 opposing a right side 1830. The top edge center extension 1820 extends approximately 1.0 inches from the bottom side 1804 of the computer shelf 424 to the outboard edge 1826 of the top edge center extension 1820. The top edge center extension 1820 measures approximately 11.0 inches between the left side 1828 and the right side 1830 of the top edge center extension 1820.

Similarly shaped and positioned, the bottom edge center extension 1822 includes an outboard edge 1832, and a left side 1834 opposing a right side 1826. The bottom edge center extension 1822 extends approximately 1.0 inches from the bottom side 1804 of the computer shelf 424 to the outboard edge 1832 of the bottom edge center extension 1822. The bottom edge center extension 1822 measures approximately 11.0 inches between the left side 1834 and the right side 1836 of the bottom edge center extension 1822.

The right edge center extension 1824 includes an outboard edge 1838, and a top side 1840 opposing a bottom side 1842. The right edge center extension 1824 extends approximately 1.0 inches from the bottom side 1804 of the computer shelf 424 to the outboard edge 1838 of the bottom edge center extension 1824. The bottom edge center extension 1824 measures approximately 8.3 inches between the top side 1840 and the bottom side 1842 of the right edge center extension 1824.

A series of three holes 1844 is machined into each extension 1820, 1822, 1824 to receive bolts to connect the passenger's side divider 418, the driver's side panel 404, and the back divider 412 so the computer shelf 424 can be supported in a substantially horizontal position relative to these vertically oriented pieces 418, 404, 412.

FIGS. 19a–c illustrate a printer shelf 426 shown in FIG. 4b. FIG. 19a shows a top view of the printer shelf 426, FIG. 19b shows a top edge view of the printer shelf 426, and FIG. 19c shows a left edge view of the printer shelf 426. A printer shelf 426 is a rectangular-shaped piece that is configured to support a printer (not shown) within the case 206 and further configured to slide outward from the front panel 406 side of the case 206 to provide user access to the printer mounted on the shelf 426. The printer shelf 426 mounts within the case 206 in a substantially horizontal position so that the shelf 426 can be inserted into and retracted from the case 206. Conventional shelf brackets or tracks (not shown) can be used to mount the printer shelf 426, where the shelf brackets connect to the driver's side panel 404 and the passenger's side divider 416 to horizontally support the printer shelf 426.

The printer shelf 426 includes a top side 1902 opposing a bottom side 1904, a top edge 1906 opposing a bottom edge 1908, and a left edge 1910 opposing a right edge 1912. The printer shelf 426 is manufactured from conventional 11 gauge steel with an approximate thickness of 0.13 inches measured from the top side 1902 to the bottom side 1904 of the shelf 426. The depth of the printer shelf 426 measures approximately 12.5 inches from the left edge 1910 to the right edge 1912 of the shelf 426, while the width of the printer shelf 426 measures approximately 12.6 inches from the left edge 1910 to the right edge 1912 of the shelf 426.

A round portal 1914 is machined into the center portion of the printer shelf 426. The portal 1914 is configured to permit electrical connections for a printer to pass through the printer shelf 426 and connect to the printer. A series of holes 1916 is machined top left and lower left and central portions of the printer shelf 426 to receive bolts to mount the printer shelf 426 to the printer. A series of steel studs 1918 extend from the center portion of the top side 1902 of the printer shelf 426. The steel studs 1918 are sized to fit corresponding holes in the printer mounted on the top side 1902 of the printer shelf 426. The steel studs 1918 are approximately ½" in length.

The left edge 1910 has an upper 1920 and lower extension 1922 that extend substantially perpendicular from the top side 1902 of the printer shelf 424. These extensions 1920, 1922 are configured to assist a user in sliding the printer shelf 424 inward or outward relative to the case 206. The upper extension 1920 includes a rounded outboard edge 1924. The upper extension 1920 extends approximately 0.6 inches from the top side 1902 of the printer shelf 424 to the outboard edge 1924 of the upper extension 1920. The upper extension 1920 measures approximately 2.2 inches long, and is spaced approximately 0.78 inches from the top edge 1906 of the shelf 424.

Similarly shaped and positioned, the lower extension 1922 includes a rounded outboard edge 1926. The lower extension 1922 extends approximately 0.6 inches from the top side 1902 of the printer shelf 424 to the outboard edge 1924 of the lower extension 1922. The lower extension 1922 measures approximately 2.2 inches long, and is spaced approximately 0.78 inches from the bottom edge 1908 of the shelf 424.

FIGS. 20a–d illustrate a drawer 428 shown in FIG. 4b. FIG. 20a shows a top view of the drawer 428, FIG. 20b shows a top edge view of the drawer 428, FIG. 20c shows a left edge view of the drawer 428, and FIG. 20d shows a right edge view of the drawer 428. A drawer 428 is a rectangular-shaped piece that is configured to provide a storage compartment within the case 206, and further configured to slide inward or outward from the front panel side 406 of the case 206 to provide user access to the drawer 428. The drawer 428 mounts within the case 206 in a substantially horizontal position so that the drawer 428 can be inserted into and retracted from the case 428. Conventional drawer brackets or tracks (not shown) are used to mount the drawer 428 in a substantially horizontal position relative to the case 206, where the drawer brackets or tracks connect to the driver's side panel 404 and the passenger's side divider 416.

The drawer 428 includes a top side 2002 opposing a bottom side 2004, a top edge 2006 opposing a bottom edge 2008, and a left edge 2010 opposing a right edge 2012. The drawer 428 is manufactured from conventional 11 gauge steel with an approximate thickness of 0.13 inches measured from the top side 2002 to the bottom side 2004 of the drawer 428. The depth of the drawer 428 measures approximately 13.0 inches from the top edge 2006 to the bottom edge 2008 of the drawer 428, while the width of the drawer 428 measures approximately 12.6 inches from the left edge 2010 to the right edge 2012 of the drawer 428.

An upper 2014 and a lower right edge corner notch 2016 are machined into the top side 2002 of the drawer 428. The upper right edge corner notch 2014 includes a right internal edge 2018 and a top internal edge 2020. The upper corner notch 2016 measures approximately 1.5 inches from the right edge 2012 of the drawer 428 to the right internal edge 2018 of the upper corner notch 2012, and approximately 1.1 inches from the top edge 2006 of the drawer 428 to the top internal edge 2020 of the upper corner notch 2016. The lower right edge corner notch 2018 includes a right internal edge 2022 and a bottom internal edge 2024. The lower corner notch 2018 measures approximately 1.5 inches from the right edge 2012 of the drawer 428 to the right internal edge 2022 of the lower corner notch 2018, and approximately 1.1 inches from the bottom edge 2008 of the drawer 428 to the bottom internal edge 2024 of the lower corner notch 2018.

A series of holes 2026 is machined into the top side 2002 of the drawer 428 to receive pins (not shown) to connect drawer dividers (not shown) inside the drawer 428. A series of two steel studs 2028 extend from near the top 2006 and bottom 2008 edges of the top side 2002 of the drawer 428, and are sized to extend and function as stops to limit the extension of the drawer 428 from the casing 206. The steel studs 2028 are approximately 0.75 inches in length.

Two vertical narrow slots 2030 are machined into the left center portion of the top side 2002 of the drawer 428 so that one is positioned relatively higher than the other. The slots 2030 are aligned parallel with the left 2010 and right edges 2012 of the drawer 428, and are collinear with the opposing slot 2030. Each slot 2030 measures approximately 2.1 inches in length and approximately 0.1 inches in width. The slots 2030 are positioned to be approximately 5.0 inches from the left edge 2010 of the drawer 428, where one slot 2030 is positioned approximately 3.2 inches from the top edge 2006 of the drawer 428 and the opposing slot 2030 is positioned approximately 3.2 inches from the bottom edge 2008 of the drawer 428.

The left edge 2010 and right edge 2012 have extensions 2032, 2034 that extend substantially perpendicular from the top side 2002 of the drawer 428. These extensions 2032, 2034 are configured to provide walls for the drawer 428. The left edge center extension 2032 can be configured to mount to a case front panel piece (not shown) that conforms with the front panel 406. The left edge center extension 2032 includes an outboard edge 2036, a top edge 2038 opposing a bottom edge 2040, and a top side 2042 opposing a bottom side 2044. The left edge center extension 2032 extends approximately 3.4 inches from the top side 2002 of the drawer 428 to the outboard edge 2036 of the left edge center extension 2032. The left edge center extension 2032 measures approximately 11.7 inches between the top edge 2038 and the bottom edge 2040 of the left edge center extension 2032. A series of holes 2046 is machined in the left edge center extension 2032 to receive bolts (not shown) to connect the left edge center extension 2032 to the case front panel piece.

The left edge extension 2032 includes a center notch 2048 and a pair of left comer notches 2050, 2052. The center notch 2048 includes an inboard internal edge 2054, and a top internal side 2056 opposing an bottom internal side 2058. The center notch 2048 is formed by the top internal 2056 and bottom internal sides 2058 extending substantially perpendicular from the top side 2002 of the drawer 428 towards the inboard internal edge 2054. The inboard internal edge 2054 extends parallel with the left edge 2010 of the drawer 428 and intersects with the top internal 2056 and bottom internal sides 2058 of the center notch 2048. The inboard internal edge 2054 measures approximately 6.0 inches between the top internal side 2056 and the bottom internal side 2058, and is spaced approximately 2.5 inches from the top edge 2038 and the bottom edge 2040 of the left edge extension 2032. The top internal 2056 and bottom internal sides 2058 measure approximately 1.7 inches between the outboard edge 2036 and the inboard internal edge 2048 of the left edge extension 2032.

The left comer notches 2050, 2052 are positioned in the left corner portions of the left edge extension 2032 adjacent to the left edge 2010 of the drawer 428. The rectangular-shaped corner notches 2050, 2052 measure approximately 0.5 inches wide from the top side 2002 of the drawer 428, and approximately 0.6 inches from the top 2038 and bottom edges 2040 of the left edge extension 2032, respectively.

The right edge extension 2034 includes an outboard edge 2060, a top edge 2062 opposing a bottom edge 2064, and a top side 2066 opposing a bottom side 2068. The right edge extension 2034 extends approximately 2.9 inches from the top side 2002 of the drawer 428 to the outboard edge 2060 of the right edge extension 2034. The right edge extension 2034 measures approximately 10.3 inches between the top edge 2062 and the bottom edge 2064 of the right edge extension 2034. A series of holes 2070 is machined in the right edge extension 2034 to receive bolts (not shown) to connect the right edge extension 2034 to cabling loops (not shown) for routing cables through the interior of the casing 206.

Figure 21:
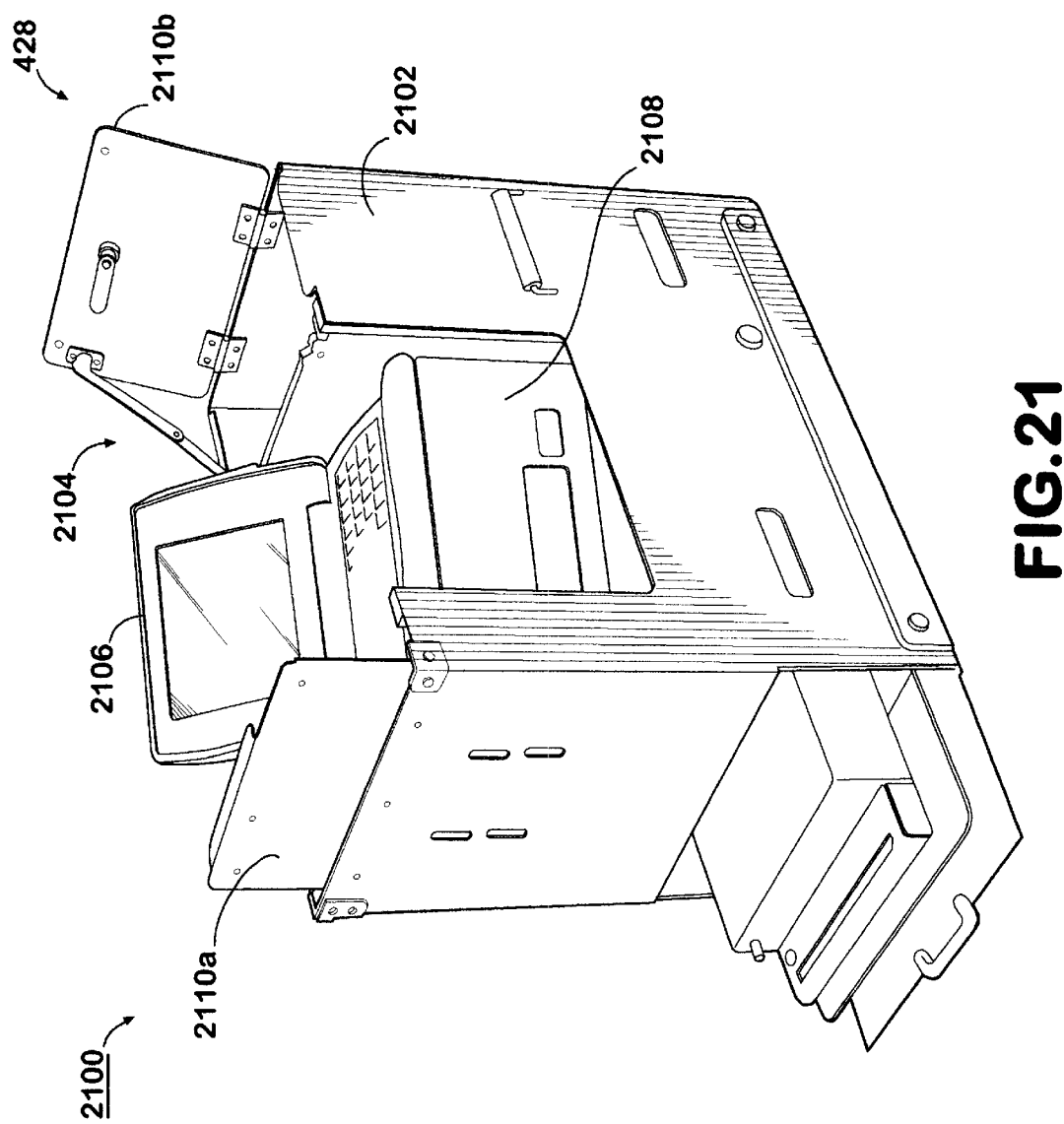
FIG. 21 illustrates another embodiment of a storage system for a portable computer.

FIG. 21 illustrates another embodiment of a storage system 2100 for a portable computer. The embodiment in FIG. 21 includes a relatively larger size case 2102 with additional storage compartments 2104 within the case 2102. A laptop or portable computer 2106 mounts to a platform 2108 similar to the configuration shown in FIGS. 17a–c. However, the case 2102 is configured for storing additional office supplies or equipment. A lid 2110a–b is divided into two portions that together provide a top portion for the case 2102 to secure the computer 2104 within the case 2102 and provide a horizontal surface for other work tasks.

In view of the foregoing, it will be appreciated that the invention provides an improved system and apparatus for the secure transport and vehicular security for a portable computer. It will be understood that the preferred embodiment has been disclosed by way of example, and that other modifications may occur to those skilled in the art without departing from the scope and spirit of the appended claims.

The invention claimed is:

1. An apparatus for mounting and securing a portable computer to an interior of a vehicle, comprising:
    a case mounted to an interior floor, ceiling, or wall surface of the vehicle for translational movement with respect thereto;
    a platform rotatably mounted to said case and configured to receive a portable computer thereon, where said platform is mounted so as to rotate with respect to the case; and
    means operatively associated with said case for selectively prohibiting access to a portable computer mounted to the platform.

2. The apparatus of claim 1, wherein the means for selectively prohibiting access to the portable computer comprises a lid movably mounted to the case, the lid being configured to prohibit access to the personal computer when closed and to permit access to the personal computer when opened.

3. The apparatus of claim 2, wherein the lid is pivotably mounted to the case.

4. The apparatus of claim 1, further comprising a base plate mounted to the interior of said vehicle for translational movement by the case being mounted to the base plate for translational movement with respect thereto.

5. The apparatus of claim 1, further comprising means operatively associated with at least one of the case and the platform for dampening the computer against vibrations from the vehicle.

6. The apparatus of claim 1, further comprising means for securing the portable computer to the platform.

7. The apparatus of claim 1, further comprising connection means for connecting the portable computer to a computer peripheral device.

8. The apparatus of claim 7, wherein the computer peripheral device comprises an antenna for transmitting data.

9. The apparatus of claim 7, wherein the computer peripheral device comprises a power supply.

10. The apparatus of claim 9, wherein the power supply is powered by a power source associated with the vehicle.

11. The apparatus of claim 7, wherein the computer peripheral device comprises a printer.

12. The apparatus of claim 1, further comprising a storage means for storing a computer peripheral.

13. The apparatus of claim 12, wherein the computer peripheral comprises a printer.

14. An apparatus for mounting and securing a portable computer to an interior of a vehicle, comprising:
    a case mounted to an interior of the vehicle for translational movement with respect thereto;
    a platform rotatably mounted to said case and configured to receive a portable computer thereon; and
    means operatively associated with said case for selectively prohibiting access to a portable computer mounted to the platform, said means comprising a lid movably mounted to the case, the lid being configured to prohibit access to the personal computer when closed and to permit access to the personal computer when opened, wherein said lid is slidably mounted to the case.

15. An apparatus for mounting and securing a portable computer to an interior of a vehicle, comprising:
    a case mounted to an interior of the vehicle for translational movement with respect thereto;
    a platform rotatably mounted to said case and configured to receive a portable computer thereon;
    means operatively associated with said case for selectively prohibiting access to a portable computer mounted to the platform; and
    a storage means for storing a computer peripheral, wherein said storage means comprises a drawer.

16. A system for mounting and securing a portable computer to an interior floor, ceiling, or wall surface of a vehicle, comprising:
    a case mounted to an interior floor, ceiling, or wall surface of the vehicle for translational movement with respect thereto;
    a platform rotatably mounted to said case and configured to receive a portable computer thereon, where said platform is mounted so as to rotate with respect to the case; and
    a lid connected to the case for preventing removal of the computer from the platform.

17. The system of claim 16, wherein the case is configured to dampen vibrations from the vehicle to the computer.

18. The system of claim 16, wherein the platform further comprises a docking station for the portable computer.

19. The system of claim 18, wherein the docking station connects to a high gain antenna for radio communication.

20. The system of claim 16, wherein the platform further comprises a power supply for the portable computer.

21. The system of claim 20, wherein the power supply electrically connects to a power source associated with the vehicle.

22. The system of claim 16, wherein the case further comprises an internal shelf configured for receiving a computer peripheral device or for storing items upon the shelf.

23. The system of claim 22, wherein the computer peripheral device comprises a printer, a modem, a storage device, and an input/output device.

24. The system of claim 16, wherein the computer peripheral device comprises a printer, a modem, a storage device, and an input/output device.

25. The system of claim 16, further comprising a lock for securing the lid into a position with respect to the case to prevent removal of the computer from the case.

26. The system of claim 16, wherein the lid moves to permit user access to the computer within the case.

27. A system for mounting and securing a portable computer to an interior of a vehicle, comprising:
- a case mounted to an interior of the vehicle for translational movement with respect thereto;
- a platform rotatably mounted to said case and configured to receive a portable computer thereon, wherein said platform further comprises a swivel mechanism for rotating the platform with respect to the case; and
- a lid connected to the case for preventing removal of the computer from the platform.

28. A system for mounting and securing a portable computer to an interior of a vehicle, comprising:
- a case mounted to an interior of the vehicle for translational movement with respect thereto, wherein said case further comprises an internal drawer configured for receiving a computer peripheral device or for storing items;
- a platform rotatably mounted to said case and configured to receive a portable computer thereon; and
- a lid connected to the case for preventing removal of the computer from the platform.

29. A system for mounting and securing a portable computer to an interior of a vehicle, comprising:
- a mounting base configured for mounting to the interior of the vehicle;
- a case comprising,
  - a base plate configured for mounting to the mounting base, and further configured for translational movement with respect to the mounting base;
  - a platform configured for receiving the portable computer, where the platform mounts to the case for rotational movement of the platform relative to the case, the platform comprising,
    - a docking station for providing power to the portable computer,
  - a swivel connecting the platform to the case, the swivel providing translational movement of the platform relative to the case,
- a lid connected to the case and configured for securing the computer to prevent removal of the computer from the platform, the lid comprising,
  - a lock for securing the position of the lid with respect to the case,
- a drawer inside the case for receiving a computer peripheral device.

30. The system of claim 29, wherein the computer peripheral device comprises a printer, a modem, a storage device, and an input/output device.

31. The system of claim 29, wherein the lid is hingeably mounted to the case to permit user access to the computer within the case.

32. The system of claim 29, wherein the lid is removably slidable to permit user access to the computer within the case.

* * * * *